United States Patent
Fujita et al.

(10) Patent No.: US 8,234,051 B2
(45) Date of Patent: Jul. 31, 2012

(54) DRIVING-FORCE CONTROL APPARATUS FOR VEHICLE

(75) Inventors: Takahito Fujita, Wako (JP); Yutaka Ishikawa, Wako (JP); Makoto Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 12/652,414

(22) Filed: Jan. 5, 2010

(65) Prior Publication Data

US 2010/0191434 A1  Jul. 29, 2010

(30) Foreign Application Priority Data

Jan. 27, 2009  (JP) .................................. 2009-14985

(51) Int. Cl.
*B60B 29/00* (2006.01)
(52) U.S. Cl. ....................................................... 701/71
(58) Field of Classification Search ........ 701/30.5–31.1, 701/70, 71, 73–76, 82–84, 90, 91; 180/116, 180/119, 164, 170; 303/146–151
See application file for complete search history.

(56) References Cited

U.S. PATENT DOCUMENTS

| | | | | |
|---|---|---|---|---|
| 5,046,787 A | * | 9/1991 | Kuwana et al. | 303/144 |
| 2003/0192729 A1 | * | 10/2003 | Sakakiyama | 180/233 |
| 2004/0040758 A1 | * | 3/2004 | Shimizu | 180/65.2 |
| 2009/0051216 A1 | * | 2/2009 | Maeda et al. | 303/146 |
| 2010/0004832 A1 | * | 1/2010 | Otake | 701/54 |

FOREIGN PATENT DOCUMENTS

| | | |
|---|---|---|
| JP | 63-183446 U | 11/1988 |
| JP | 1-95550 U | 6/1989 |
| JP | 6-289039 A | 10/1994 |
| JP | 9-256884 A | 9/1997 |
| JP | 11-63209 A | 3/1999 |
| JP | 2001-115870 A | 4/2001 |
| JP | 2003-042276 A | 2/2003 |
| JP | 2007-237819 A | 9/2007 |

* cited by examiner

*Primary Examiner* — Mary Cheung
(74) *Attorney, Agent, or Firm* — Arent Fox LLP

(57) ABSTRACT

Several low-friction-coefficient road-surface determination devices determine whether a road surface has a low friction coefficient based on the highest and lowest wheel speeds; the wheel speeds of front and rear wheels; wheel speeds of a left-hand and right-hand driving wheels; and by comparing a reference vehicle-body acceleration calculated from a driving force of an engine with an actual vehicle-body acceleration calculated from a calculated number of revolutions of differential gears. A low-friction-coefficient road-surface total-determination device makes a total determination as to whether the road surface has a low friction coefficient based on the determination results of the low-friction-coefficient road-surface determination devices. Accordingly, each low-friction-coefficient road-surface determination device is capable of compensating for disadvantages of the other devices.

12 Claims, 16 Drawing Sheets

FIG. 11

| | FIRST LOW μ ROAD-SURFACE DETERMINATION MEANS M1 | SECOND LOW μ ROAD-SURFACE DETERMINATION MEANS M2 | THIRD LOW μ ROAD-SURFACE DETERMINATION MEANS M3 | FOURTH LOW μ ROAD-SURFACE DETERMINATION MEANS M4 |
|---|---|---|---|---|
| METHOD | DETERMINE WHEEL-SPEED DIFFERENCE BETWEEN HIGHEST WHEEL SPEED AND LOWEST WHEEL SPEED OF FOUR WHEELS F_LM4W | DETERMINE WHEEL-SPEED DIFFERENCE BETWEEN AVERAGE FRONT WHEEL SPEED AND AVERAGE REAR WHEEL SPEED F_DYS | DETERMINE WHEEL-SPEED DIFFERENCE BETWEEN LEFT FRONT WHEEL SPEED AND RIGHT FRONT WHEEL SPEED F_DVF2W | DETERMINE DOWNWARD-SLOPE DESCENDING-DEGREE F_LMPK |
| ADVANTAGE | DETECTION CAN BE MADE EVEN WHEN ANY WHEELS ARE SLIPPED (UNIVERSAL TYPE) | DETECTION ACCURACY DURING STRAIGHT-AHEAD DRIVING CAN BE IMPROVED BECAUSE STEERING AMOUNT IS NOT TAKEN INTO CONSIDERATION | SETTING CAN BE MADE SPECIFIC TO PROTECTION OF DIFFERENTIAL GEARS, IN THE SAME MANNER AS THE CONVENTIONAL TECHNIQUE, BY LIMITING DETECTION TO LEFT FRONT WHEEL AND RIGHT FRONT WHEEL | DETECTION CAN BE MADE EVEN WHEN FOUR WHEELS HAVE LOW μ AT THE SAME TIME; THERE IS NO AFFECTION OF REAR WHEEL FAILURE |
| DISADVANTAGE | DETECTION CANNOT BE MADE FOR FOUR WHEELS AT THE SAME TIME; THRESHOLD SETTING NEEDS TO BE MADE BY TAKING STEERING AMOUNT INTO CONSIDERATION; THERE IS AFFECTION OF REAR WHEEL FAILURE | DETECTION CANNOT BE MADE AT ALL FOR DIFFERENCE BETWEEN LEFT AND RIGHT SIDES; THERE IS AFFECTION OF REAR WHEEL FAILURE | ONLY FRONT WHEELS ARE DETECTABLE | DETECTION ACCURACY IS LOW FOR SLIGHTLY LOW μ |
| DETECTION | APPROPRIATE FOR SMALL DRIVING FORCE | APPROPRIATE FOR SMALL DRIVING FORCE | APPROPRIATE FOR SMALL DRIVING FORCE | APPROPRIATE FOR LARGE DRIVING FORCE; INAPPROPRIATE FOR SMALL DRIVING FORCE |

DRIVING-FORCE CONTROL APPARATUS FOR VEHICLE

BACKGROUND OF THE INVENTION

1. Field of the Invention

The present invention relates to a driving-force control apparatus for a vehicle having an engine and a transmission, the driving-force control apparatus including driving-force control means for determining a state of a road surface on which the vehicle is running and for controlling a driving force of the vehicle based on the determined state of the road surface.

2. Description of the Related Art

Japanese Patent Application Laid-open No. 6-289039 (JP '039) discloses a slip-amount calculating apparatus for a vehicle. JP '039 teaches a feature wherein if all of the rotational speed sensors of the four wheels are working normally, the slip amount is calculated based on the average value of the rotational speeds of the right and the left idler wheels and the average value of the rotational speeds of the right and the left driving wheels. If the rotational speed sensor of the right front wheel or the rotational speed sensor of the right rear wheel is not working normally, the slip amount is calculated based on the rotational speed of the left front wheel and the rotational speed of the left rear wheel. If the rotational speed sensor of the left front wheel or the rotational speed sensor of the left rear wheel does not work normally, the slip amount is calculated based on the rotational speed of the right front wheel and the rotational speed of the right rear wheel.

Japanese Patent Application Laid-open No. 11-63209 (JP '209) discloses an automatic-transmission controlling apparatus for a vehicle which inhibits the up-shifting of gears from the second gear to the third gear if the driving wheels slip when the vehicle starts on ice. The automatic-transmission controlling apparatus detects the slip rate of the torque converter based on the engine speed and the number of revolutions of the input shaft of the automatic transmission. If the slip rate exceeds, for example, 102%, and the driving force is transmitted in the opposite direction from the side of the driving wheels to the side of the engine, the controlling apparatus determines that a pseudo slip state caused by the locking and the unlocking of the driving wheels has occurred, and the controlling apparatus cancels the inhibition of the up-shifting of gears by the automatic transmission.

Japanese Utility Model Application Laid-open No. 63-183446 (JP '446) discloses an abnormal-running preventing apparatus for backward motion. JP '446 teaches a feature wherein if the reverse switch is turned on and, at the same time, the degree or extent the throttle opens increases rapidly, the abnormal-running preventing apparatus cuts the fuel to the engine to reduce the driving force.

Japanese Utility Model Application Laid-open No. 1-95550 (JP '550) discloses a travel-safety apparatus for a vehicle. JP '550 teaches a feature wherein a threshold of the vehicle speed for the reverse gear and a threshold of the engine speed for the reverse gear are set to be lower than the threshold for any other gear. If the reverse gear is selected, and, at the same time, at least one of the vehicle speed and the engine speed exceeds the corresponding threshold, the travel-safety apparatus cuts the fuel to the engine to reduce the driving force.

The slip-amount calculating apparatus for a vehicle disclosed in JP '039 suffers from a deficiency wherein if all of the wheel speed sensors provided for the four wheels are working abnormally, a determination as to the road-surface conditions cannot be made.

The automatic-transmission controlling apparatus for a vehicle disclosed in JP '209 suffers from a deficiency wherein the apparatus inhibits the up-shifting of gears if it is determined that the road surface is a low-friction-coefficient road surface. The apparatus, however, does not inhibit the down-shifting of gears even with the same determination. Accordingly, the driving force may occasionally increase due to a down-shifting of gears. As such, if the vehicle is running in snowy conditions, an increase in the driving force may cause the driving wheel to be buried in the snow, resulting in the vehicle becoming stuck in the snow.

The abnormal-running preventing apparatus for backward motion disclosed in JP '446 and the travel-safety apparatus for a vehicle disclosed in JP '550 suffer from a deficiency wherein cutting of the fuel supply is executed only while the reverse gear is selected. For this reason, if any forward gear is selected, the excessive driving force generated on a low-friction-coefficient road surface may cause the vehicle to get stuck.

SUMMARY OF THE INVENTION

The present invention has been attained in view of the above discussed circumstances and reliably suppresses the slip of wheels by accurately determining the conditions of the road surface, thereby controlling the driving force of the vehicle.

According to a first feature of the present invention, a driving-force control apparatus for a vehicle having an engine and a transmission includes a driving-force control apparatus which determines a state of a road surface on which the vehicle is running and controls a driving force of the vehicle based on the determined state of the road surface. The driving-force control apparatus includes first to fourth low-friction-coefficient road-surface determining devices. The first low-friction-coefficient road-surface determining device determines whether the road surface has a low friction coefficient based on the highest wheel speed and the lowest wheel speed from the wheel speeds of all wheels. The second low-friction-coefficient road-surface determining device determines whether the road surface has a low friction coefficient based on the wheel speed of the front wheels and the wheel speed of the rear wheels. The third low-friction-coefficient road-surface determining device determines whether the road surface has a low friction coefficient based on the wheel speed of a left driving wheel and the wheel speed of a right driving wheel. The fourth low-friction-coefficient road-surface determining device determines whether the road surface has a low friction coefficient by comparing a reference vehicle-body acceleration calculated from a driving force of the engine with an actual vehicle-body acceleration calculated from the number of revolutions of a differential gear. The driving-force control apparatus also includes a low-friction-coefficient road-surface total-determination device that determines whether the road surface has a low friction coefficient based on the determination results of the first to fourth low-friction-coefficient road-surface determining devices; a grip-travel determining device that determines whether the vehicle is running with good gripping or without gripping based on the determination results of the first to fourth low-friction-coefficient road-surface determining devices and a driving state of the vehicle; and a low-friction-coefficient road-surface suspect determining device that determines whether there is a possibility that the road surface has a low friction coefficient based on the determination result of the low-friction-coefficient road-surface total-determination device and the determination result of the grip-travel determining device.

According to the above-described structural configuration of the first feature, the first low-friction-coefficient road-surface determining device determines whether the road surface has a low friction coefficient based on the highest wheel speed and the lowest wheel speed from the wheel speeds of all the wheels. In addition, the second low-friction-coefficient road-surface determining device determines whether the road surface has a low friction coefficient based on the wheel speeds of the front wheels and the wheel speeds of the rear wheels. Moreover, the third low-friction-coefficient road-surface determining device determines whether the road surface has a low friction coefficient based on the wheel speed of the left-hand driving wheel and the wheel speed of the right-hand driving wheel. Furthermore, the fourth low-friction-coefficient road-surface determining device determines whether the road surface has a low friction coefficient by comparing the reference vehicle-body acceleration calculated from the driving force of the engine with the actual vehicle-body acceleration calculated from the number of revolutions of the differential gears. Still furthermore, the low-friction-coefficient road-surface total-determination device makes a total determination as to whether the road surface has a low friction coefficient based on the determination results of the first to fourth low-friction-coefficient road-surface determining devices. Accordingly, each of the first to fourth low-friction-coefficient road-surface determining devices is able to compensate for the disadvantages of the other devices, and the advantages of each of the devices can be realized on their own. Thus, the inventive driving-force control apparatus operates at a relatively high accuracy rate in determining whether the road surface has a low friction coefficient.

In addition to the low-friction-coefficient road-surface total-determination device, the structural configuration of the first feature also includes a grip-travel determining device and a low-friction-coefficient road-surface suspect determining device. The grip-travel determining device determines whether the vehicle is running with good gripping or without gripping based on the determination results of the first to the fourth low-friction-coefficient road-surface determining devices and the driving state of the vehicle. The low-friction-coefficient road-surface suspect determining device determines whether there is a possibility or likelihood that the road surface has a low friction coefficient based on the determination result of the low-friction-coefficient road-surface total-determination device and the determination result of the grip-travel determining device. Accordingly, based on the determined state of the road surface, the driving-force controller is able to appropriately control the driving force of the vehicle, and thus, the slipping of the wheels is effectively prevented.

According to a second feature of the present invention, the first low-friction-coefficient road-surface determining device compares a difference between the highest wheel speed and the lowest wheel speed among the wheel speeds of all the wheels relative to a threshold amount, and determines that the road surface has a low friction coefficient if the difference exceeds the threshold amount.

According to the structural configuration of the second feature, the first low-friction-coefficient road-surface determining device compares the difference between the highest wheel speed and the lowest wheel speed among the wheel speeds of all the wheels relative to the threshold amount, and determines that the road surface has a low friction coefficient if the difference exceeds the threshold amount. Accordingly, even if any of the four wheels slips, a determination can be made as to whether the road surface has a low friction coefficient.

According to a third feature of the present invention, the second low-friction-coefficient road-surface determining device compares a difference between an average value of the wheel speeds of the front wheels and an average value of the wheel speeds of the rear wheels relative to a threshold amount, and determines that the road surface has a low friction coefficient if the difference exceeds the threshold amount.

According to the structural configuration of the third feature, the second low-friction-coefficient road-surface determining device compares the difference between an average value of the wheel speeds of the front wheels and an average value of the wheel speeds of the rear wheels relative to the threshold amount, and determines that the road surface has a low friction coefficient if the difference exceeds the threshold amount. Accordingly, the determination as to whether the road surface has a low friction coefficient can be made without being affected by the steering of the front wheels.

According to a fourth feature of the present invention, the third low-friction-coefficient road-surface determining device compares a difference between the wheel speed of the left driving wheel and the wheel speed of the right driving wheel relative to a threshold amount, and determines that the road surface has a low friction coefficient if the difference exceeds the threshold amount.

According to the structural configuration of the fourth feature, the third low-friction-coefficient road-surface determining device compares the difference between the wheel speed of the left-hand driving wheel and the wheel speed of the right-hand driving wheel relative to the threshold amount, and determines that the road surface has a low friction coefficient if the difference exceeds the threshold amount. Accordingly, a determination can reliably be made as to whether the vehicle is in a dangerous state where the road surface with a low friction coefficient causes each differential gear to have the corresponding right-hand wheel and the corresponding left-hand wheel rotating at different wheel speeds.

According to a fifth feature of the present invention, the fourth low-friction-coefficient road-surface determining device compares the reference vehicle-body acceleration calculated from the driving force of the engine with the actual vehicle-body acceleration calculated from number of revolutions of the front and rear differential gears, and determines that the road surface has a low friction coefficient if the actual vehicle-body acceleration exceeds the reference vehicle-body acceleration by an amount that exceeds a threshold amount.

According to the structural configuration of the fifth feature, the fourth low-friction-coefficient road-surface determining device compares the reference vehicle-body acceleration calculated from the driving force of the engine with the actual vehicle-body acceleration calculated from the revolutions of differential gears, and determines that the road surface has a low friction coefficient if the actual vehicle-body acceleration exceeds the reference vehicle-body acceleration by a margin that exceeds the threshold amount. Accordingly, even if all of the four wheels slip, the determination can be made as to whether the road surface has a low friction coefficient. In addition, since the number of revolutions of the differential gears are used during such a determination, the determination is not affected by a failure of wheel-speed sensors.

According to a sixth feature of the present invention, the low-friction-coefficient road-surface total-determination device makes a total determination that the road surface has a low friction coefficient if at least one of the first to fourth low-friction-coefficient road-surface determining device determines that the road surface has a low friction coefficient, and the low-friction-coefficient road-surface total-determination device makes a total determination that the road surface has a high friction coefficient if none of the first to fourth low-friction-coefficient road-surface determining devices determines that the road surface has a low friction coefficient.

According to the structural configuration of the sixth feature, the low-friction-coefficient road-surface total-determination device makes a total determination that the road surface has a low friction coefficient if at least one of the first to fourth low-friction-coefficient road-surface determining devices determines that the road surface has a low friction coefficient, and makes a total determination that the road surface has a high friction coefficient if none of the first to fourth low-friction-coefficient road-surface determining devices determines that the road surface has a low friction coefficient. Accordingly, a determination that the road surface has a low friction coefficient or a high friction coefficient is accurately determined.

According to a seventh feature of the present invention, the grip-travel determination device determines that the vehicle is running with good gripping if: none of the first to fourth low-friction-coefficient road-surface determining devices determines that the road surface has a low friction coefficient; an accelerator opening degree exceeds a threshold amount; a vehicle speed exceeds a threshold amount; and a slip rate of a torque converter exceeds a threshold amount, and the grip-travel determination device determines that the vehicle is running without gripping if at least one of the first to fourth low-friction-coefficient road-surface determining devices determines that the road surface has a low friction coefficient.

According to the structural configuration of the seventh feature, the grip-travel determination device determines that the vehicle is running with good gripping if: none of the first to fourth low-friction-coefficient road-surface determining devices determines that the road surface has a low friction coefficient; the accelerator opening degree exceeds the threshold amount; the vehicle speed exceeds the threshold; and the slip rate of the torque converter exceeds the threshold amount. In addition, the grip-travel determination device determines that the vehicle is running without gripping if at least one of the first to fourth low-friction-coefficient road-surface determining devices determines that the road surface has a low friction coefficient. Accordingly, a determination that the vehicle is running with or without gripping is accurately determined.

According to an eighth feature of the present invention, the low-friction-coefficient road-surface suspect determining device determines that there is a possibility or likelihood that the road surface has a low friction coefficient if the low-friction-coefficient road-surface total-determination device determines that the road surface has a low friction coefficient, and even if the low-friction-coefficient road-surface total-determination device does not determine that the road surface has a low friction coefficient, the low-friction-coefficient road-surface suspect determination device determines that there is a possibility or likelihood that the road surface has a low friction coefficient unless the grip-travel determination device determines that the vehicle is running with good gripping.

According to the structural configuration of the eighth feature, the low-friction-coefficient road-surface suspect determination device determines that there is a possibility or likelihood that the road surface has a low friction coefficient if the low-friction-coefficient road-surface total-determination device determines that the road surface has a low friction coefficient. In addition, even if the low-friction-coefficient road-surface total-determination device does not determine that the road surface has a low friction coefficient, the low-friction-coefficient road-surface suspect determination device determines that there is a possibility or likelihood that the road surface has a low friction coefficient unless the grip-travel determination device determines that the vehicle is running with good gripping. Accordingly, the determination that there is a possibility of the road surface having a low friction coefficient is made without being omitted.

According to a ninth feature of the present invention, the driving-force control apparatus includes a fuel-cutting controller that cuts fuel to the engine, and if the low-friction-coefficient road-surface total-determination device determines that the road surface has a low friction coefficient, the fuel-cutting controller cuts the supply of fuel to the engine to reduce the driving force.

According to the structural configuration of the ninth feature, if the low-friction-coefficient road-surface total-determination device determines that the road surface has a low friction coefficient, the fuel-cutting controller executes the fuel-cutting operation to reduce the driving force. Accordingly, the wheels are prevented from slipping on a road surface having a low friction coefficient, such as an ice-covered road surface.

According to a tenth feature of the present invention, the fuel-cutting controller switches engine speeds as a condition for executing the fuel-cutting operation, between a time during which a forward-travelling range is selected and a time during which a backward-travelling range is selected.

According to the structural configuration of the tenth feature, the fuel-cutting controller switches engine speeds for executing the fuel cutting operation based on whether the forward-travelling range is selected or the backward-travelling range is selected. Accordingly, the fuel-cutting operation is executed at appropriate engine speeds for when the vehicle is travelling forward as well as backward.

According to an eleventh feature of the present invention, the driving-force control apparatus includes a shift-changing inhibitor that inhibits the shift-changing of the transmission, and inhibits down-shifting to a speed range that is equal to or lower than a predetermined speed range: if the third low-friction-coefficient road-surface determination device determines that the road surface has a low friction coefficient; or if any of the first, second, and fourth low-friction-coefficient road-surface determining devices determines that the road surface has a low friction coefficient and, at the same time, if the lowest wheel speed becomes lower than a threshold amount.

According to the structural configuration of the eleventh feature, the shift-changing inhibitor inhibits down-shifting to a speed range that is equal to or lower than the predetermined speed range if the third low-friction-coefficient road-surface determining device determines that the road surface has a low friction coefficient. Alternatively, the shift-changing inhibitor inhibits down-shifting in the same way if any of the first, second, and fourth low-friction-coefficient road-surface determining devices determines that the road surface has a low friction coefficient and, at the same time, if the lowest wheel speed becomes lower than the threshold amount. Accordingly, the vehicle is prevented from getting stuck on a road surface having a low friction coefficient, such as a snowy road.

According to a twelfth feature of the present invention, the shift-changing inhibitor cancels the inhibition of shift-changing: if the vehicle is running with good gripping and the fuel-cutting controller is not operating; or if the vehicle is running with good gripping and the fuel-cutting controller is operating, and, in addition, if the accelerator opening degree is smaller than a threshold.

According to the structural configuration of the twelfth feature, the shift-changing inhibitor cancels inhibition of shift-changing if the vehicle is running with good gripping and the fuel-cutting controller is not operating. Alternatively, the shift-changing inhibitor cancels the inhibition of shift-changing if the vehicle is running with good gripping and the fuel-cutting controller is operating, and, in addition, if the accelerator opening degree is smaller than the threshold. Accordingly, the inhibition of shift-changing is prevented from being unnecessarily executed when there is no possibility or likelihood of the wheels slipping.

The above description, other aspects, characteristics and advantages of the present invention will be clear from detailed description which will be provided for the preferred embodiment while referring to the attached drawings.

BRIEF DESCRIPTION OF THE DRAWINGS

FIG. 11 is a chart used to explain the advantages associated with the first to fourth low-friction-coefficient road-surface determining devices;

DESCRIPTION OF THE PREFERRED EMBODIMENT

An embodiment of the present invention will be described below with reference to FIGS. 1 to 16.

Figure 1:
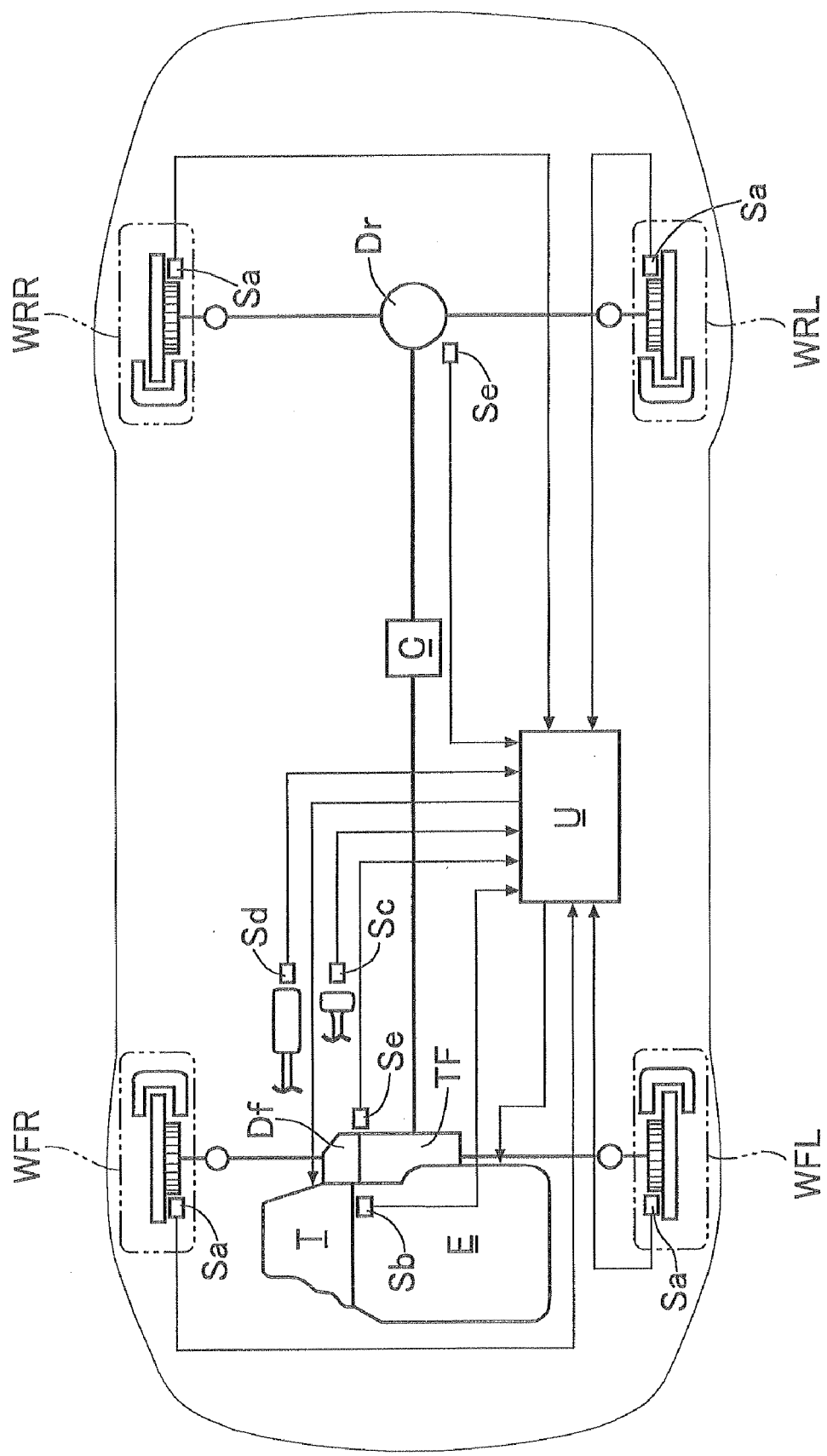
FIG. 1 is a schematic diagram illustrating a vehicle including a driving-force control apparatus according to an embodiment of the present invention.

As shown in FIG. 1, a four-wheel-drive vehicle includes a left front wheel WFL, a right front wheel WFR, a left rear wheel WRL, and a right rear wheel WRR. Of the four wheels, the two front wheels WFL and WFR are main driving wheels, which are driven all the time, and the two rear wheels WRL and WRR are sub-driving wheels, which are driven when necessary. Part of the driving force generated by an engine E is transmitted to the left front wheel WFL and the right front wheel WFR via a transmission T and a front-side differential gear Df. In addition, part of the driving force is transmitted from the transmission T to the left rear wheel WRL and the right rear wheel WRR through a transfer TF, a viscous coupling C, and a rear-side differential gear Dr.

An electronic control unit U is provided to control the cutting off of or other reduced supply level of fuel to the engine E and the shifting of the transmission T. Connected to the electronic control unit U are: wheel-speed sensors Sa, which detect wheel speeds of corresponding front and rear wheels WFL, WFR, WRL, and WRR; an engine-speed sensor Sb, which detects the engine speed; a shift-range sensor Sc, which detects the shift range of the transmission T; an accelerator-opening-degree sensor Sd, which detects the accelerator opening degree; and differential-gear-revolution sensors Se, Se, which detect the revolutions of the corresponding front-side and the rear-side differential gears Df and Dr. On the basis of the signals transmitted from the sensors Sa to Se, the electronic control unit U controls the cutting off of or reduction in the level of fuel supplied to the engine E, and the shifting of the transmission T.

Figure 2:
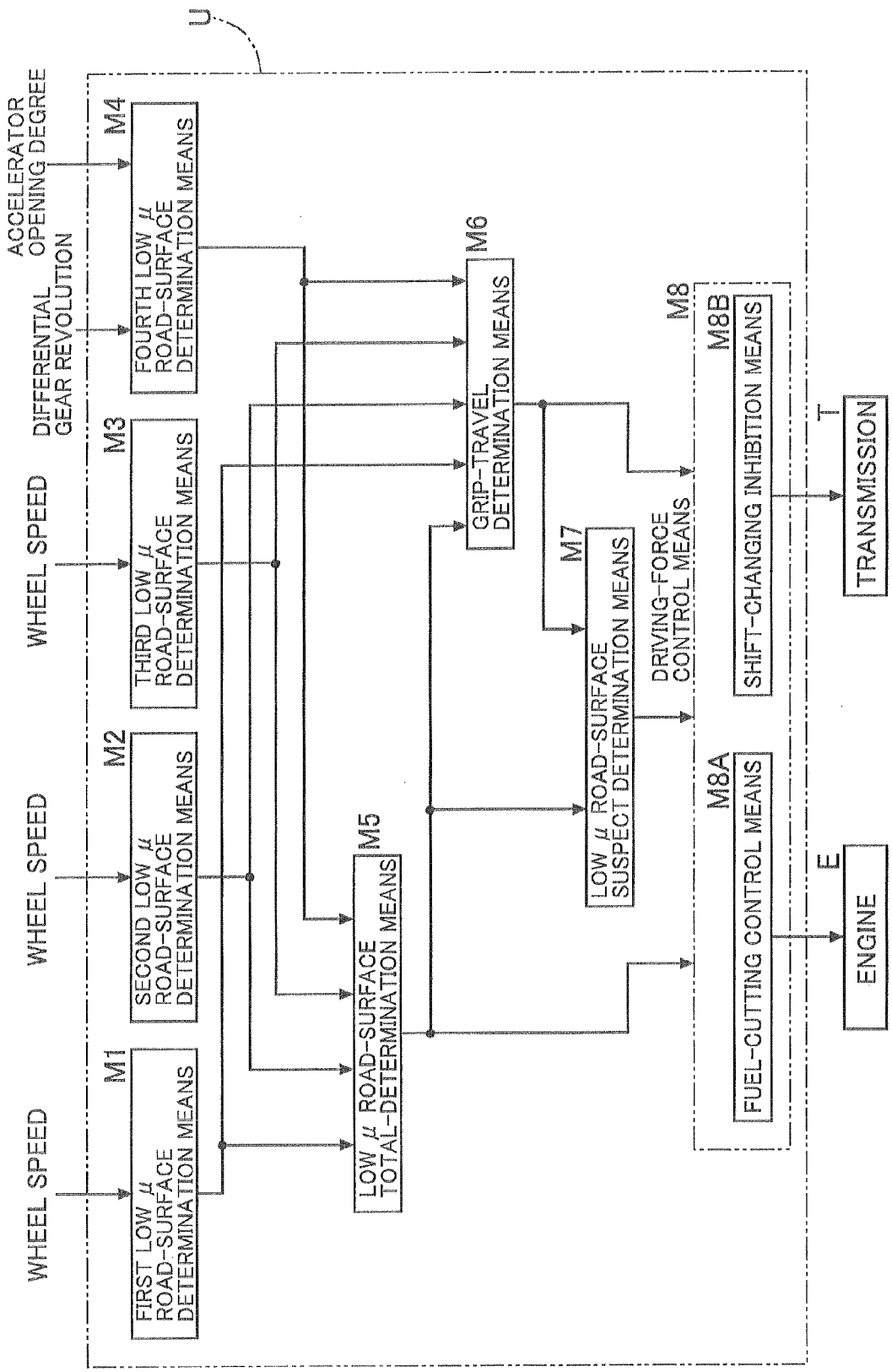
FIG. 2 is a block diagram of an electronic control unit of the driving-force control apparatus.

As shown in FIG. 2, the electronic control unit U includes a first low-friction-coefficient road-surface determination means M1, a second low-friction-coefficient road-surface determination means M2, a third low-friction-coefficient road-surface determination means M3, a fourth low-friction-coefficient road-surface determination means M4, a low-friction-coefficient road-surface total-determination means M5, a grip-travel determination means M6, a low-friction-coefficient road-surface suspect determination means M7, and a driving-force control means M8. The driving-force control means M8 includes a fuel-cutting control means MBA, which controls the cutting off of or the reduction in the amount or level of fuel supplied to the engine E, and a shift-changing inhibition means MBB, which controls the shifting of the transmission T.

Subsequently, a main routine will be described below by referring to a flowchart shown in FIG. 3.

First, at step S1, each of the first to fourth low-friction-coefficient road-surface determination means M1 to M4 determines whether the road surface is a road surface with a low friction coefficient by using a corresponding one of first to fourth methods, which will be described in detail below. At step S2, the low-friction-coefficient road-surface total-determination means M5 executes a total determination as to whether the road surface is a road surface with a low friction coefficient by taking into account all of the determination results obtained by the first to fourth methods. As a result, if the low-friction-coefficient road-surface total-determination means M5 determines that a low-friction-coefficient road-surface total-determination flag is set to zero (i.e., F LOMYU=0, meaning that the road surface has a high friction coefficient), the grip-travel determination means M6 executes, at step S3, a grip-running determination (i.e., a determination as to whether, while the vehicle is running, the wheels grip the road surface sufficiently well and without slipping). As a result, if the grip-travel determination means M6 determines that a grip-running determination flag is set to one (i.e., F GRIP=1, meaning that the vehicle is running with good gripping), the low-friction-coefficient road-surface suspect determination means M7 sets, at step S4, a low-friction-coefficient suspect determination flag to zero (i.e., F MBLM=0, meaning that there is no reason to believe or likelihood that the road surface has a low friction coefficient).

If the low-friction-coefficient road-surface total-determination means M5 determines, in the total determination at step S2, that the low-friction-coefficient road-surface total-determination flag is set to one (i.e., F LOMYU=1, meaning that the road surface has a low friction coefficient), the fuel-cutting control means M8A executes, at step S5, a request that the fuel-cutting engine switches speed for the purpose of preventing the driving wheels from slipping. In addition, if the grip-travel determination means M6 determines, at step S3, that the grip-running determination flag is set to zero (i.e., F GRIP=0, meaning that the vehicle is not running with good gripping), and if the operational flow goes through the process performed at step S5, the low-friction-coefficient road-surface suspect determination means M7 sets, at step S6, the low-friction-coefficient suspect determination flag to one (i.e., F MBLM=1, meaning that there is a reason to believe or likelihood that the road surface has a low friction coefficient). Then, at the subsequent step S7, the shift-changing inhibition means M8B executes a process which inhibits the shifting of the transmission T for the purpose of preventing the driving wheels from slipping.

Figure 3:
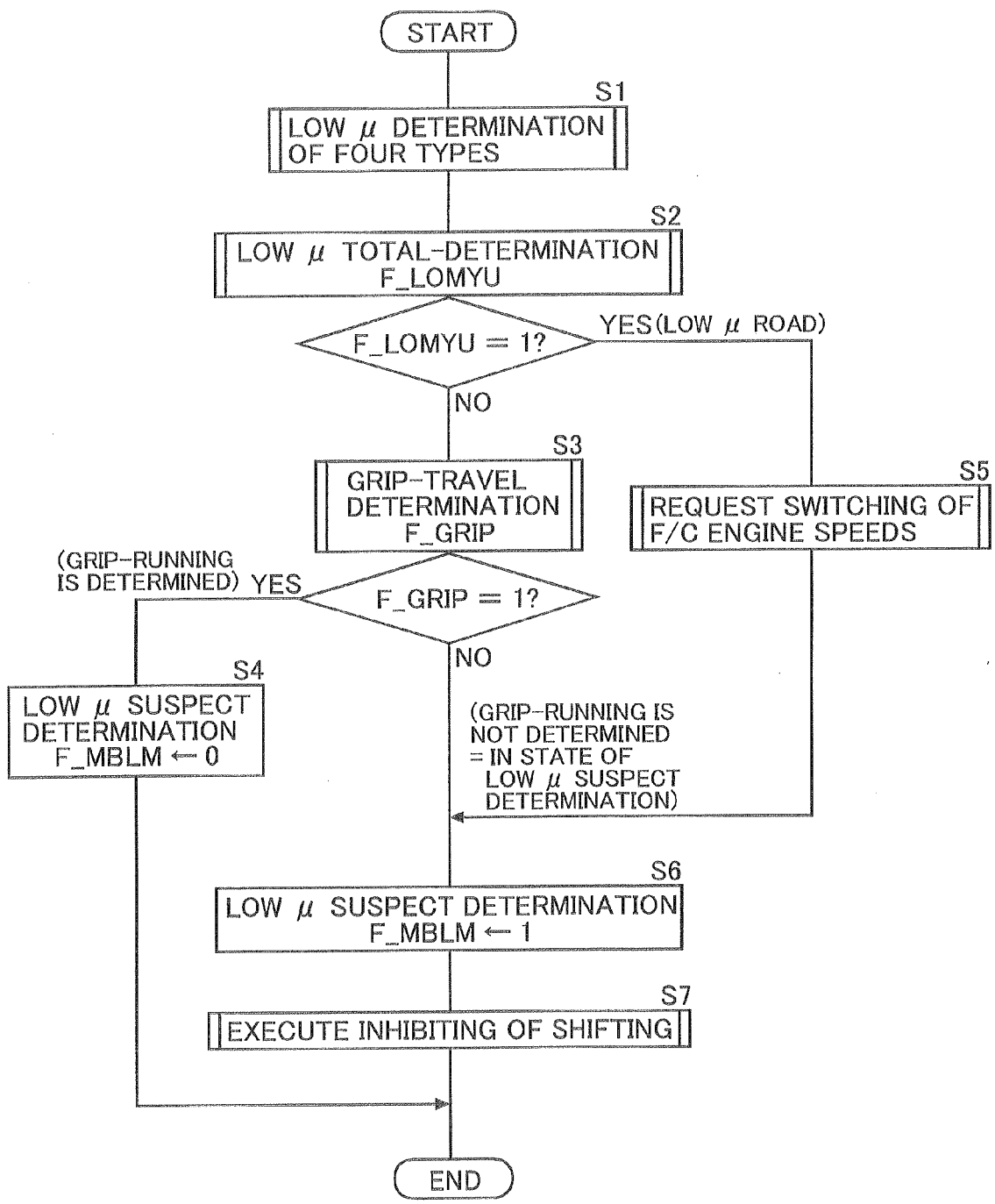
FIG. 3 is a flowchart of a main routine performed by the electronic control unit of the driving-force control apparatus.

FIG. 3 clearly shows the inter-relationships among the determination that the low-friction-coefficient road-surface total-determination flag should be set to one (i.e., F LOMYU=1, meaning that the road surface has a low friction coefficient), the determination that the low-friction-coefficient suspect determination flag should be set to one (i.e., F MBLM=1, meaning that there is a reason to believe or likelihood that the road surface has a low friction coefficient), and the determination that the grip-running determination flag should be set to one (i.e., F GRIP=1, meaning that the vehicle is running with good gripping). A more specific description of the inter-relationships among these determinations will be provided below.

Now, suppose a case where a determination at step S2 is made that the low-friction-coefficient road-surface total-determination flag should be set to one (i.e., F LOMYU=1, meaning that the road surface has a low friction coefficient). In this case, a determination at step S6 is automatically made that the low-friction-coefficient suspect determination flag should be set to one (i.e., F MBLM=1, meaning that there is a reason to believe or likelihood that the road surface has a low friction coefficient).

Now, suppose a case where no determination at step S2 is made that the low-friction-coefficient road-surface total-determination flag should be set to one (i.e., F LOMYU=1, meaning that the road surface has a low friction coefficient). In this case, unless the determination at step S3 is made that the grip-running determination flag should be set to one (i.e., F GRIP=1, meaning that the vehicle is running with good gripping), the determination at step S6 is also automatically made that the low-friction-coefficient suspect determination flag should be set to one (i.e., F MBLM=1, meaning that there is a reason to believe or likelihood that the road surface has a low friction coefficient).

To understand the reason behind this automatic determination, suppose a case where the vehicle is running on ice. In this case, if the driver releases the accelerator pedal, the total determination at step S2 may be made that the low-friction-coefficient road-surface total-determination flag should be set to zero (i.e., F LOMYU=0, meaning that the road surface has a high friction coefficient). Even with this total determination, there is a reason to believe or a likelihood that the road surface actually has a low friction coefficient. Accordingly, unless the determination at step S3 is made that the vehicle is running with good gripping, the determination is made that the low-friction-coefficient suspect determination flag should be set to one (i.e., F MBLM=1, meaning that there is a reason to believe or likelihood that the road surface has a low friction coefficient).

If the determination at step S3 is made that the grip-running determination flag should be set to one (i.e., F GRIP=1, meaning that the vehicle is running with good gripping), the determination at step S4 is made that the low-friction-coefficient suspect determination flag should be set to zero (i.e., F MBLM=0, meaning that there is no reason to believe or likelihood that the road surface has a low friction coefficient). In other words, the determination that the low-friction-coefficient suspect determination flag is set to zero (i.e., F MBLM=0, meaning that there is no reason to believe or likelihood that the road surface has a low friction coefficient) is obtained only on condition that the determination at step S3 is made that the grip-running determination flag should be set to one (i.e., F GRIP=1, meaning that the vehicle is running with good gripping).

TABLE 1

| | DETERMINATION | | | ACTION | |
| --- | --- | --- | --- | --- | --- |
| | F_LOMYU | F_MBLM | F_GRIP | INHIBITING OF SHIFTING | SWITCHING OF F/C ENGINE SPEEDS |
| I | X | X | ○ | X | X |
| II | ○ | ○ | X | ○ | ○ |
| III | X | ○ | X | ○ | X |

TABLE 1 summarizes the above-described operations. In a case where the low-friction-coefficient road-surface total-determination flag is set to zero (i.e., F LOMYU=0), the low-friction-coefficient suspect determination flag is set to zero (i.e., F MBLM=0), and the grip-running determination flag is set to one (i.e., F GRIP=1), the road surface has a high friction coefficient. Accordingly, inhibition of the shifting and switching of the fuel-cutting engine speeds are not executed.

In a case where the low-friction-coefficient road-surface total-determination flag is set to one (i.e., F LOMYU=1), the low-friction-coefficient suspect determination flag is set to one (i.e., F MBLM=1), and the grip-running determination flag is set to zero (i.e., F GRIP=0), the road surface has a low friction coefficient. Accordingly, inhibition of the shifting and switching of the fuel-cutting engine speeds are executed.

In a case where the low-friction-coefficient road-surface total-determination flag is set to zero (i.e., F LOMYU=0), the low-friction-coefficient suspect determination flag is set to one (i.e., F MBLM=1), and the grip-running determination flag is set to zero (i.e., F GRIP=0), there is a reason to believe or likelihood that the road surface has a low friction coefficient. Accordingly, the inhibition of the shifting is executed and switching of the fuel-cutting engine speeds is not executed.

Next, a first method by which the first low-friction-coefficient road-surface determination means M1 determines whether the road surface has a low friction coefficient will be described by referring to a flowchart shown in FIG. 4 and which illustrates a sub-routine of step S1.

First, the highest and lowest of the four wheel speeds are calculated at step S11. Then, the wheel-speed difference (denoted by SVLVF4R) between the highest wheel speed and the lowest wheel speed is calculated at step S12. At step S13, if the determination is made that a highest-lowest wheel-speed-difference determination flag is set to zero (i.e., F LM4W=0, meaning that the wheel-speed difference is small), the wheel-speed difference SVLVF4R is compared with a threshold reference value to determine the presence of a low-friction-coefficient road-surface at step S14. If the wheel-speed difference SVLVF4R is larger than the threshold reference value, a low-friction-coefficient road-surface determination flag F LM4W is set to one (i.e., F LM4W=1, meaning that the road surface has a low friction coefficient) at step S15.

In contrast, if the determination at step S13 is made that the highest-lowest wheel-speed-difference determination flag should be set to one (i.e., F LM4W=1, meaning that the wheel-speed difference is large), the wheel-speed difference SVLVF4R is compared with the threshold reference value at step S16 to determine if the low-friction-coefficient road-surface determination should be canceled. If the wheel-speed difference SVLVF4R is smaller than the threshold reference value, the low-friction-coefficient road-surface determination is canceled and the low-friction-coefficient road-surface determination flag F LM4W is set to zero (i.e., F LM4W=0, meaning that the road surface has a high friction coefficient) at the subsequent step S17.

Figure 4:
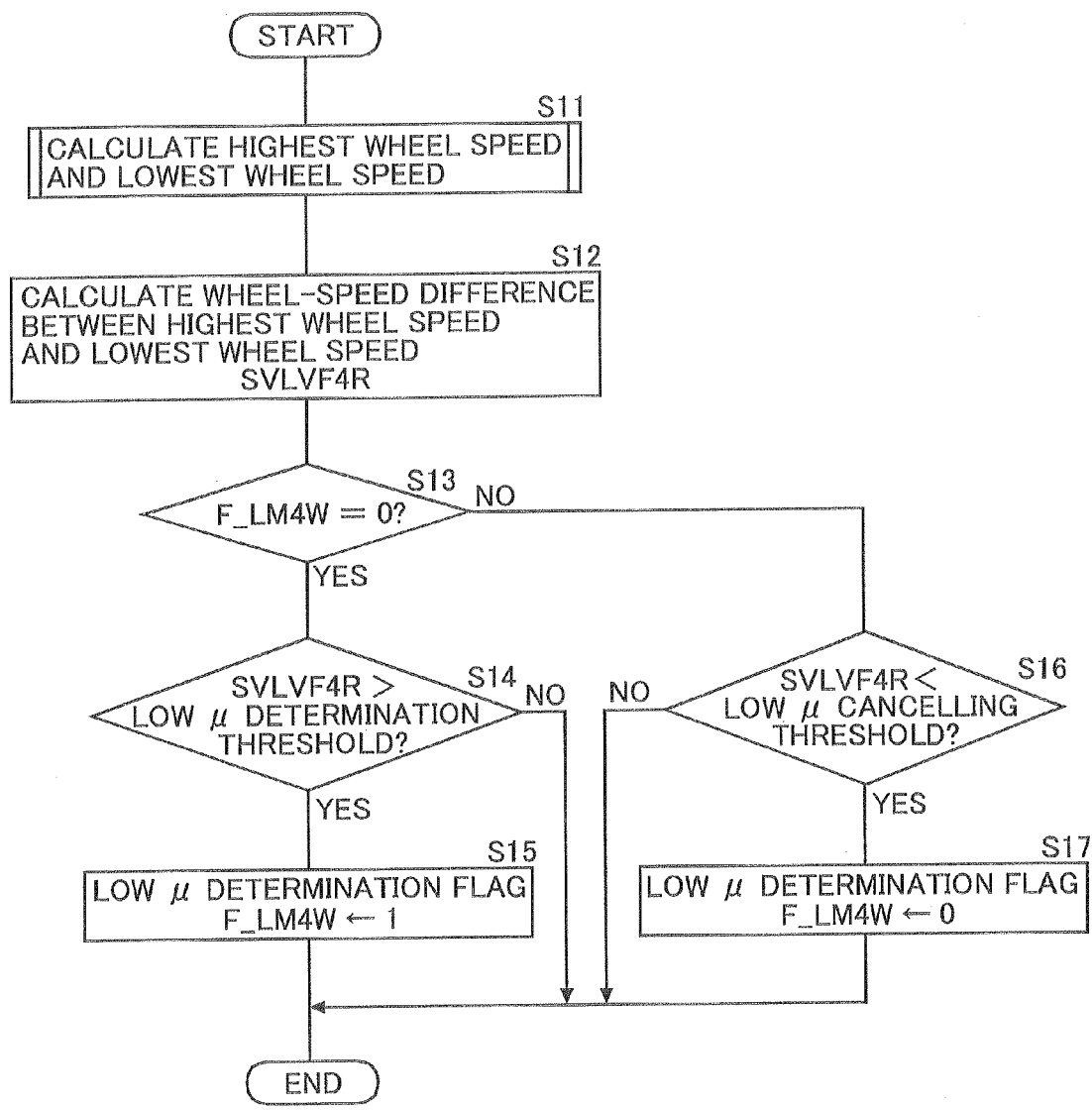
FIG. 4 is a flowchart of a sub-routine of step S1 of the main routine performed by a first low-friction-coefficient road-surface determining device.
Figure 5:
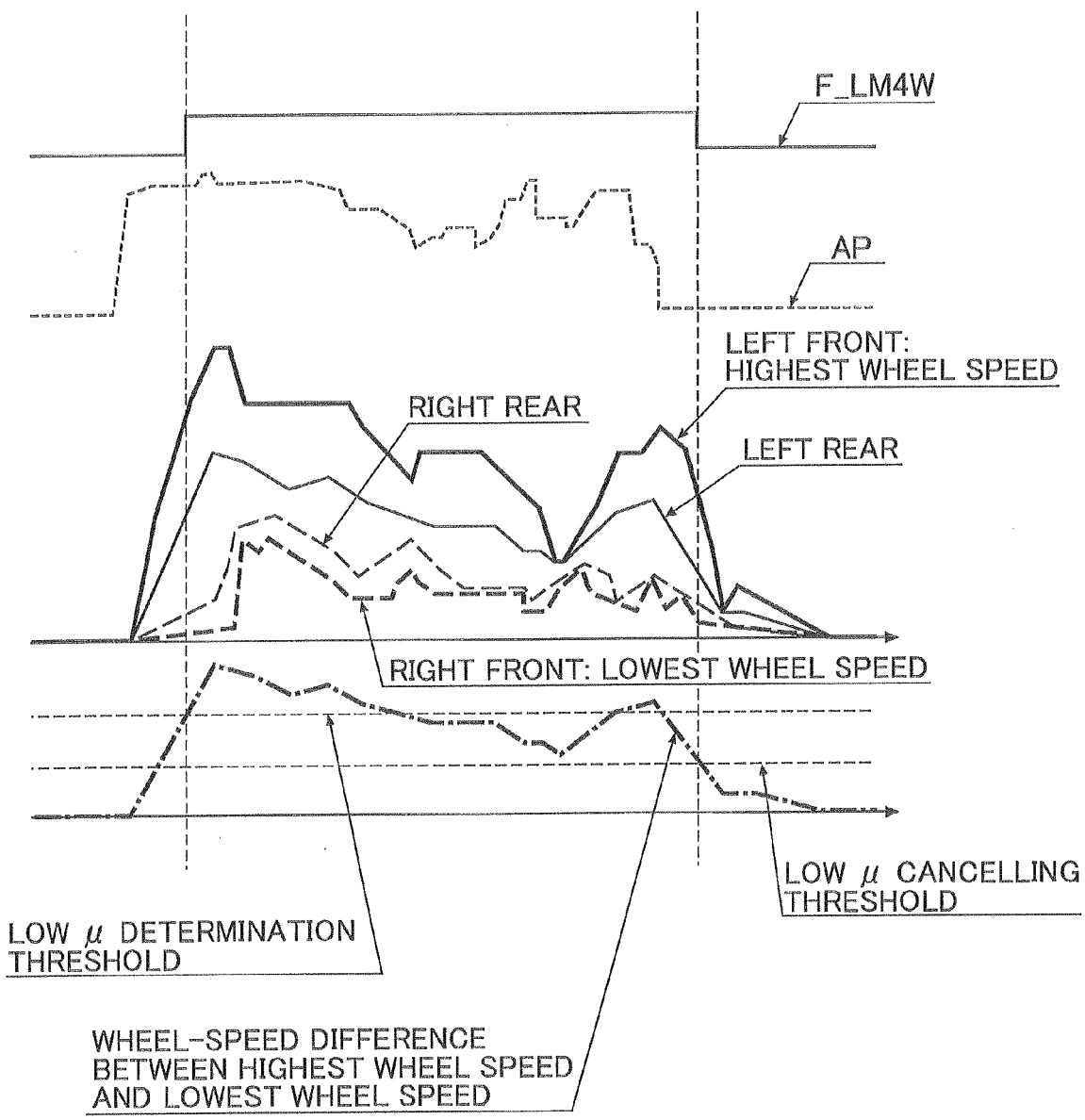
FIG. 5 is a time chart corresponding to FIG. 4.

FIG. 5 is a time chart relating to the operations shown in the flowchart of FIG. 4. If the wheel-speed difference between the highest wheel speed and the lowest wheel speed, (i.e., SVLVF4R) exceeds the threshold reference value for the low-friction-coefficient road-surface determination, the low-friction-coefficient road-surface determination flag F LM4W is set to one (i.e., F LM4W=1). If the wheel-speed difference between the highest wheel speed and the lowest wheel speed, (i.e., SVLVF4R) is less than the threshold value, which is required to cancel the low-friction-coefficient road-surface determination, the low-friction-coefficient road-surface determination flag F LM4W is set to zero (i.e., F LM4W=0).

Next, a second method by which the second low-friction-coefficient road-surface determination means M2 determines whether the road surface has a low friction coefficient will be described by referring to a flowchart shown in FIG. 6, and which illustrates a sub-routine of step S1.

First, the average front-wheel speed of the right and left front wheels and the average rear-wheel speed of the right and left rear wheels are calculated at step S21. Then, the average-wheel-speed difference (denoted by SVLVF2R) between the average front-wheel speed and the average rear-wheel speed is calculated at step S22. If a determination at step S23 is made that a low-friction-coefficient road-surface determination flag F DYS has been set to zero (i.e., F DYS=0, meaning that the road surface has a high friction coefficient), the average-wheel-speed difference SVLVF2R is compared with a threshold reference value to determine the presence of a low-friction-coefficient road-surface at step S24. If the average-wheel-speed difference SVLVF2R is larger than the threshold reference value, the low-friction-coefficient road-surface determination flag F DYS is set to one (i.e., F DYS=1, meaning that the road surface has a low friction coefficient) at step S25.

In contrast, step S23 determines that a low-friction-coefficient road-surface determination flag F DYS has been set to one (i.e., F DYS=1, meaning that the road surface has a low friction coefficient), the average-wheel-speed difference SVLVF2R is compared with a threshold reference value at step S26 to determine if the low-friction-coefficient road-surface determination should be cancelled. If the average-wheel-speed difference SVLVF2R is smaller than the threshold reference value, the low-friction-coefficient road-surface determination flag F DYS is set to zero (i.e., F DYS=0, meaning that the road surface has a high friction coefficient) at step S27.

Figure 6:
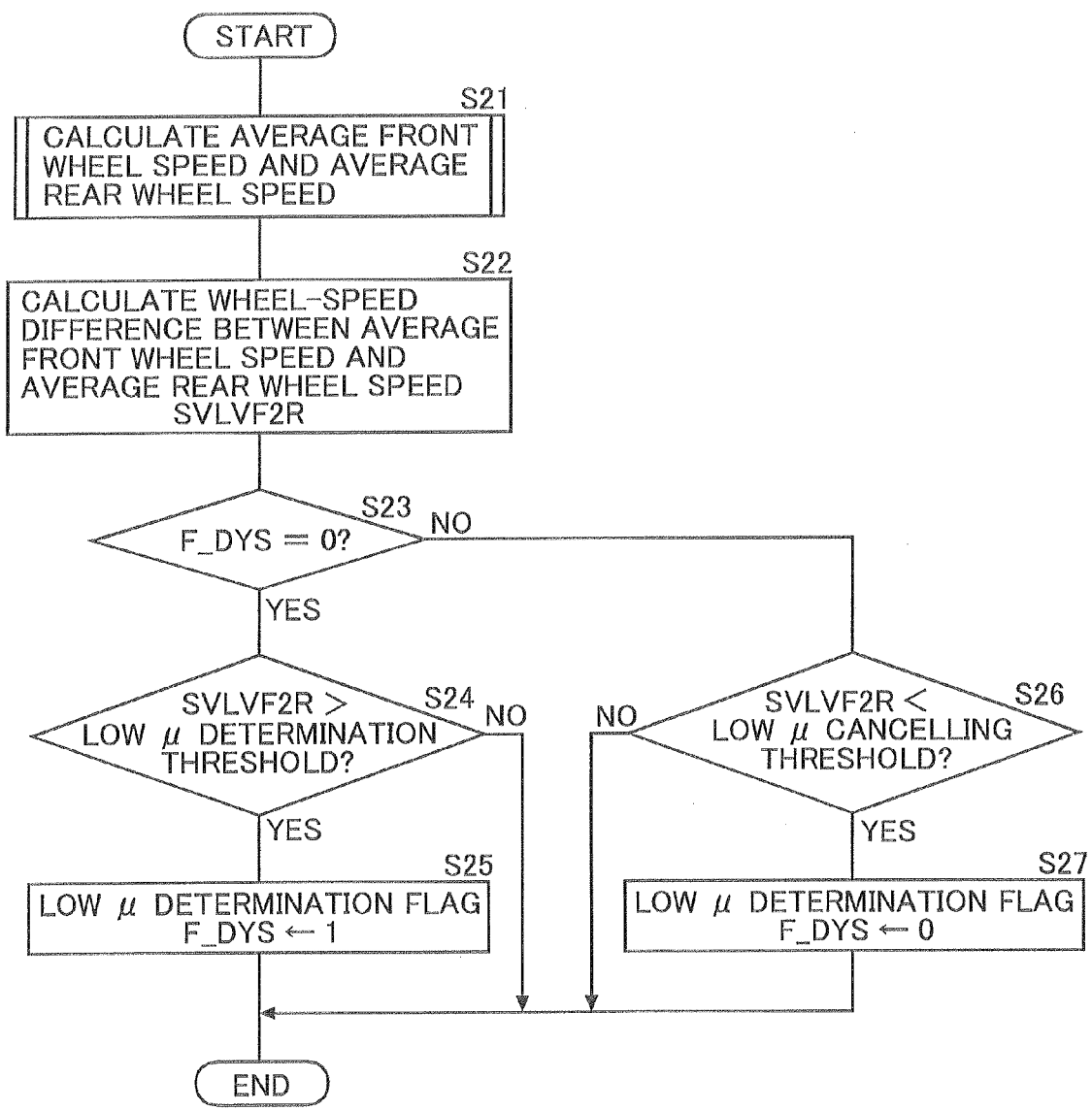
FIG. 6 is a flowchart of a sub-routine of step S1 of the main routine performed by a second low-friction-coefficient road-surface determining device.
Figure 7:
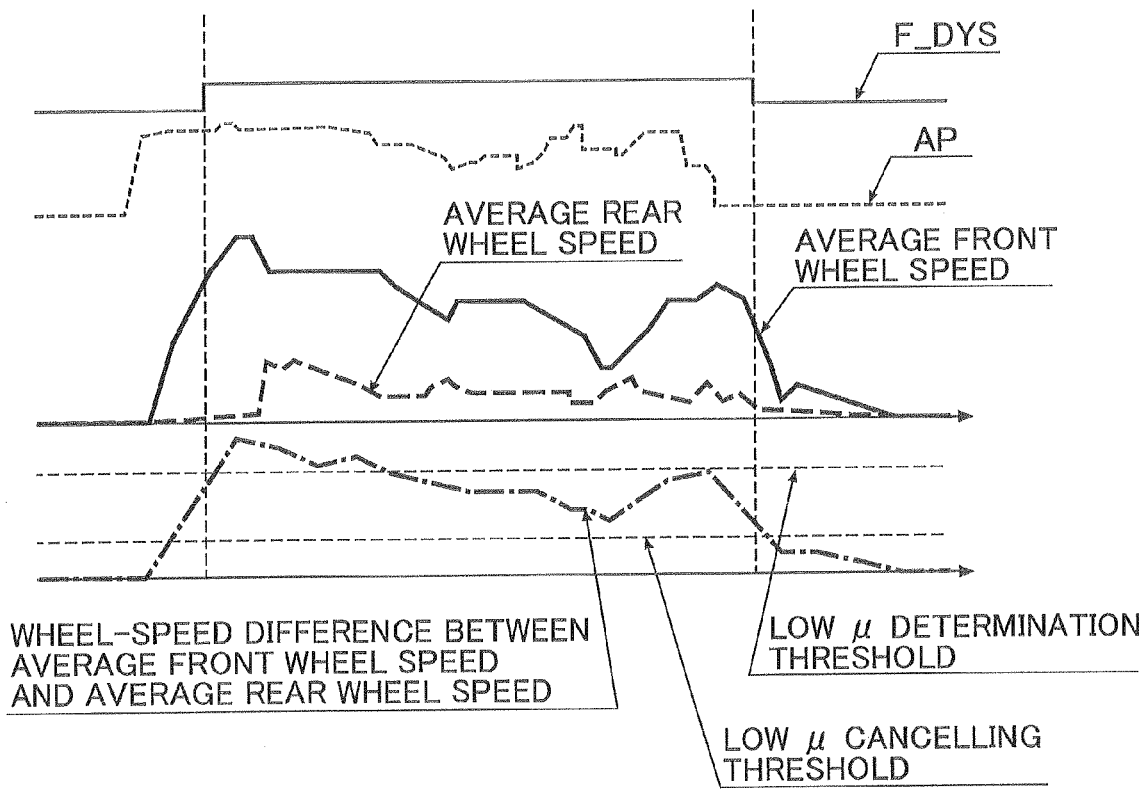
FIG. 7 is a time chart corresponding to FIG. 6.

FIG. 7 is a time chart relating to the operations shown in the flowchart of FIG. 6. If the average-wheel-speed difference between the front wheels and the rear wheels (i.e., SVLVF2R) exceeds the threshold reference value for the low-friction-coefficient road-surface determination, the low-friction-coefficient road-surface determination flag F DYS is set to one (i.e., F DYS=1). If the average-wheel-speed difference between the front wheels and the rear wheels (i.e., SVLVF2R) is less than the threshold reference value, which is required to cancel the low-friction-coefficient road-surface determination, the low-friction-coefficient road-surface determination flag F DYS is set to zero (i.e., F DYS=0).

Next, a third method by which the third low-friction-coefficient road-surface determination means M3 determines whether the road surface has a low friction coefficient will be described by referring to a flowchart shown in FIG. 8, and which illustrates a sub-routine of step S1.

First, the speed of the right front wheel and the speed of the left front wheel are calculated at step S31. Then, the right-left front-wheel-speed difference (denoted by DVF2W), that is, the difference between the speed of the right front wheel and the speed of the left front wheel, is calculated at step S32. If a determination at the subsequent step S33 is made that a low-friction-coefficient road-surface determination flag F DVF2W has been set to zero (i.e., F DVF2W=0, meaning that the road surface has a high friction coefficient), the right-left front-wheel-speed difference DVF2W is compared with a threshold reference value for the low-friction-coefficient road-surface determination at step S34. If the right-left front-wheel-speed difference DVF2W is larger than the threshold reference value, the low-friction-coefficient road-surface determination flag F DVF2W is set to one (i.e., F DVF2W=1, meaning that the road surface has a low friction coefficient) at step S35.

If the determination at step S33 is made that a low-friction-coefficient road-surface determination flag F DVF2W has been set to one (i.e., F DVF2W=1, meaning that the road surface has a low friction coefficient), the right-left front-wheel-speed difference DVF2W is compared with a threshold reference value at step S36 to determine if the low-friction-coefficient road-surface determination should be cancelled. If the right-left front-wheel-speed difference DVF2W is smaller than the threshold reference value, the low-friction-coefficient road-surface determination flag F DVF2W is set to zero (i.e., F DVF2W=0, meaning that the road surface has a high friction coefficient) at step S37.

Figure 8:
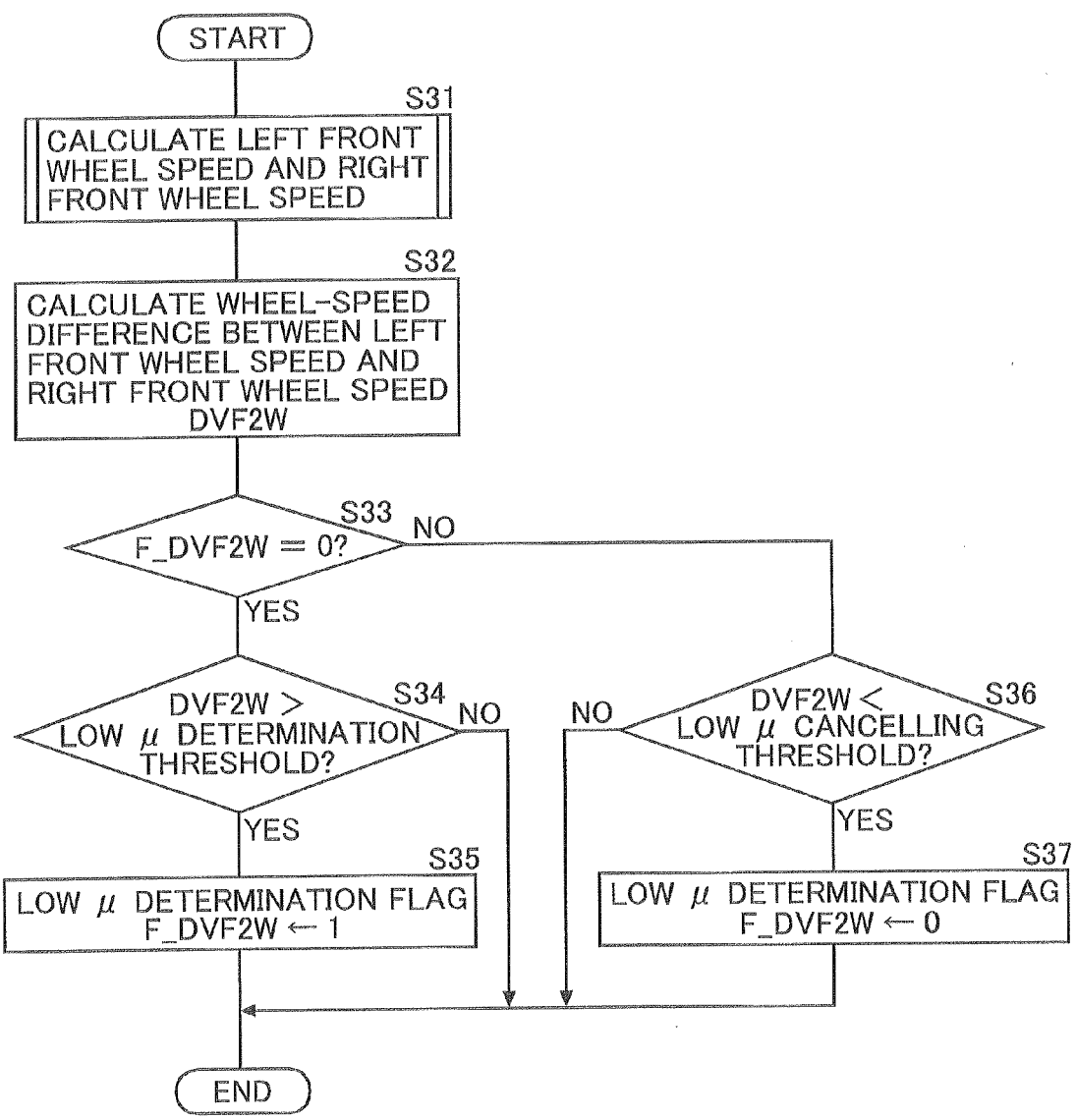
FIG. 8 is a flowchart of a sub-routine of step S1 of the main routine performed by a third low-friction-coefficient road-surface determining device.
Figure 9:
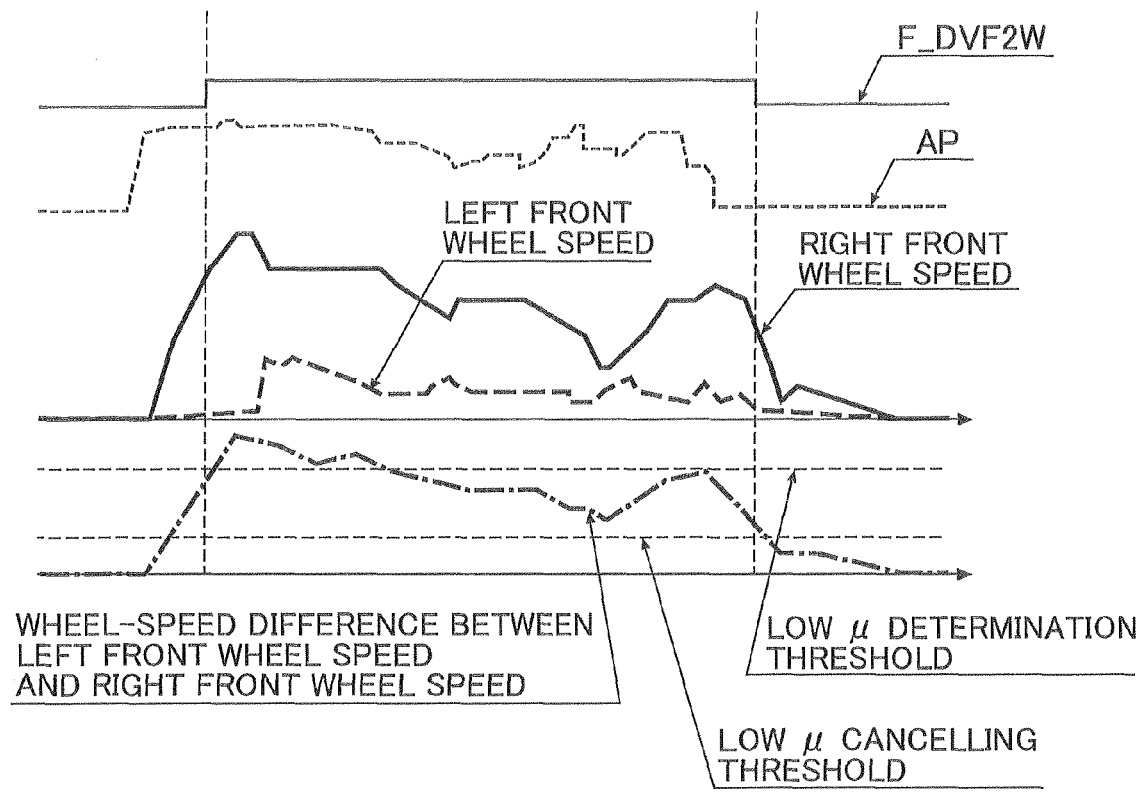
FIG. 9 is a time chart corresponding to FIG. 8.

FIG. 9 is a time chart relating to the operations shown in the flowchart of FIG. 8. If the right-left front-wheel-speed difference DVF2W exceeds the threshold reference value for the low-friction-coefficient road-surface determination, the low-friction-coefficient road-surface determination flag F DVF2W is set to one (i.e., F DVF2W=1). If the right-left front-wheel-speed difference DVF2W is less than the threshold reference value, which is required to cancel the low-friction-coefficient road-surface determination, the low-friction-coefficient road-surface determination flag F DVF2W is set to zero (i.e., F DVF2W=0).

Figure 10:
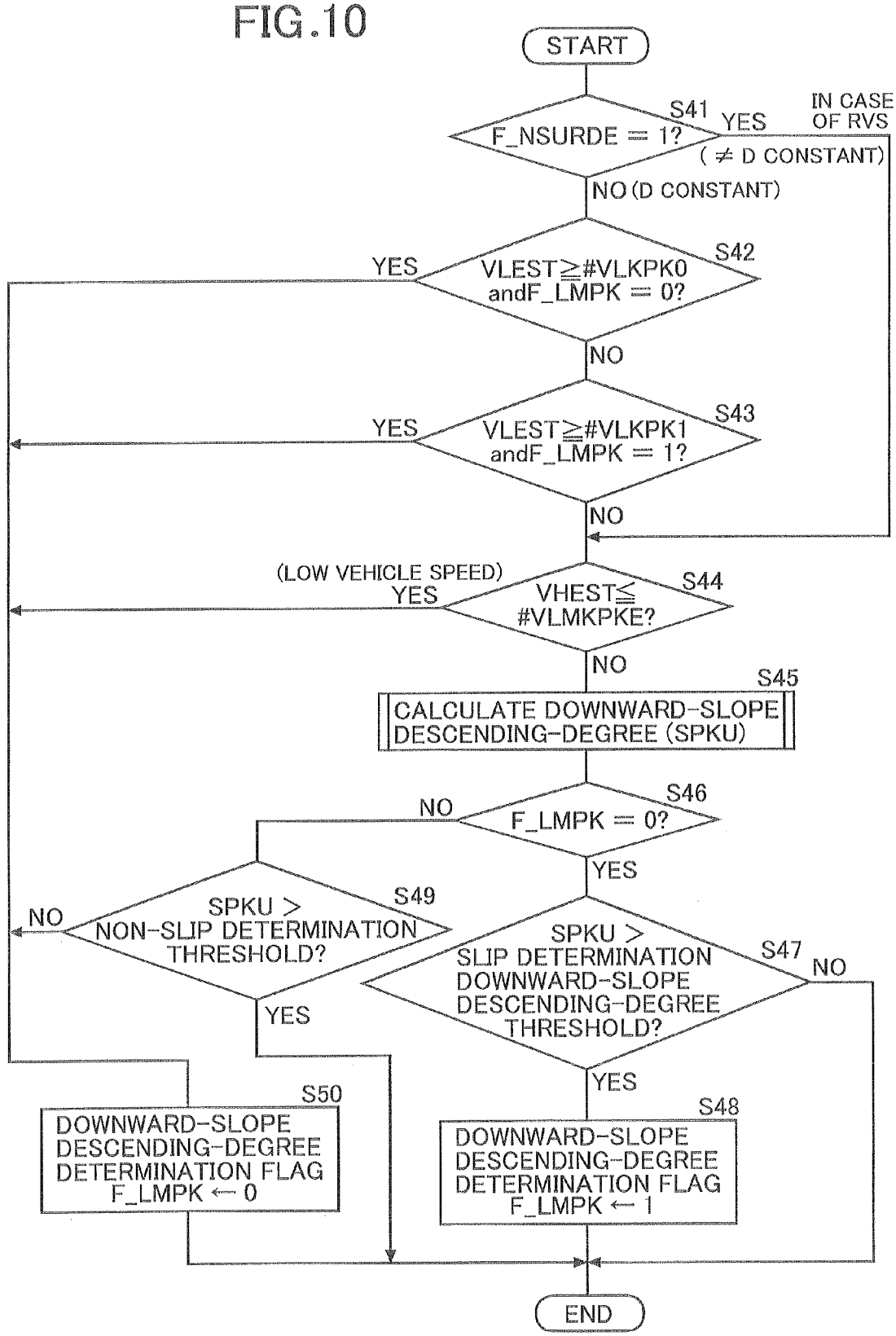
FIG. 10 is a flowchart of a sub-routine of step S1 of the main routine performed by a fourth low-friction-coefficient road-surface determining device.

Next, a fourth method by which the fourth low-friction-coefficient road-surface determination means M4 determines whether the road surface has a low friction coefficient will be described by referring to a flowchart shown in FIG. 10, and which illustrates a sub-routine of step S1.

First, suppose a case where a determination at step S41 is made that the reverse determination flag F NSURED has not been set to 1 and the D-range (or Drive range) is constantly selected as the shift range. In this case, if a determination at step S42 is made that the lowest speed of the four wheels (the speed is denoted by VLEST) is equal to or higher than a threshold speed #VLKPK0 and, at the same time, that a downward-slope descending-degree determination flag F LMPK has been set to zero (meaning that the downward slope is gentle and that the road surface has a high friction coefficient), a determination as to the descending degree of the downward slope at step S47 is not made. This is because it is preferable to execute the slip determination only when the vehicle is likely to get stuck. Accordingly, when the wheel speed is large and the friction coefficient of the road surface is large, a determination as to the descending degree of the downward slope does not have to be made.

Even if the determination result at step S42 is NO, the determination of the descending degree of the downward slope is not made at step S47 when the following is determined at step S43: the lowest speed of the four wheels (VLEST) is equal to or greater than a threshold speed #VLKPK1; and, at the same time, the downward-slope descending-degree determination flag F LMPK has been set to one (meaning that the downward slope is steep and that the road surface has a low friction coefficient). This is because there is a risk of an erroneous determination when the vehicle is running in a high-speed shift range. If such a risk is taken into consideration, a high wheel speed is a good reason for avoiding the determination as to the descending degree of the downward slope.

Even if the determination result at step S43 is NO, the determination of the descending degree of the downward slope is not made at step S47 when the following is determined at step S44: the highest speed of the four wheels (VHEST) is equal to or less than a threshold speed #VLMKPKE. This is because determining the descending degree of the downward slope requires rotating the wheels. Accordingly, if the highest speed of the four wheels (VHEST) is equal to or less than the threshold speed #VLMKPKE, the descending degree of the downward slope will be determined with insufficient accuracy.

Now, suppose another case where the determination at step S41 is made that the reverse determination flag F NSURED has been set to 1 and the reverse range is selected as the shift range. In this case, the operational flow skips steps S42 and S43, and proceeds directly to step S44. This is because when the reverse range is selected, execution of slip determination is strongly needed. Accordingly, when the R-range (or Reverse range) is selected, the slip determination is made without taking steps S42 and S43 into consideration.

Then, if NO is the determined result of each of steps S42 to S44, the descending degree of the downward slope (SPKU) is calculated at step S45. Specifically, the relationship between the engine output and the reference vehicle-body acceleration has been measured on a flat road surface with a high friction coefficient, and the measured relationship has been stored before the vehicle-body acceleration actually generated by a vehicle running on a downward slope. As the vehicle-body acceleration actually generated exceeds the reference vehicle-body acceleration by a larger margin, a larger descending degree of the downward slope (SPKU) is calculated. In this event, if the wheel speed is raised by the wheels slipping due to a small friction coefficient of the road surface, the calculated vehicle-body acceleration becomes larger and, as a result, an even larger descending degree of the downward slope (SPKU) is calculated. The descending degree of the downward slope (SPKU) may be relatively large such that it is unlikely that the vehicle is running with good gripping of the wheels. A determination with such a relatively large value of the descending degree of the downward slope (SPKU) can be made that the road surface has a low friction coefficient.

In this event, the determination as to the road-surface friction coefficient relies not on the wheel-speed sensors Sa, but on the differential-gear-revolution sensors Se, Se. Accordingly, the determination is made without being affected by a failure of the wheel-speed sensor(s) Sa.

If a determination at step S46 is made that the downward-slope descending-degree determination flag F LMPK has been set to zero (i.e. F LMPK=0, meaning that the downward slope is gentle and that the road surface has a high friction coefficient), and, at the same time, if the determination at step S47 is made that the descending degree of the downward slope (SPKU) exceeds a slip-determination descending-degree threshold, a determination is made that the road surface has a low friction coefficient. Then, at step S48 the downward-slope descending-degree determination flag F LMPK is set to one (i.e., F LMPK=1, meaning that the downward slope is steep and that the road surface has a low friction coefficient).

In contrast, suppose a case where the determination result of at least one of steps S42 to S44 is YES, or where the determination result of step S46 is NO and, at the same time, the determination at step S49 is made that the descending degree of the downward slope (SPKU) is equal to or less than a non-slip determination threshold and the determination is made that the road surface has a high friction coefficient. Then, at step S50 the downward-slope descending-degree determination flag F LMPK is set to zero (i.e., F LMPK=0, meaning that the downward slope is gentle and that the road surface has a high friction coefficient).

FIG. 11 describes the various advantages of the four methods for determining the friction coefficient of the road surface that were described above.

The first low-friction-coefficient road-surface determination means M1 compares the difference between the highest and lowest of the four wheel speeds with a threshold reference speed difference value. If the difference exceeds the threshold reference speed difference value, the determination is made that the road surface has a low frictional coefficient. Accordingly, the first method has an advantage wherein even in the case where one of the four wheels slips, it is possible to execute the determination as to whether the road surface has a low friction coefficient. Nevertheless, the first method has some disadvantages. First, if all four sensors simultaneously fail to work properly, it is not possible to determine whether the road surface has a low friction coefficient. Second, the threshold reference speed difference value should be set by taking the steering angle of the front wheels into consideration. Third, the determination may be affected by the failure of the wheel-speed sensors Sa for the rear wheels.

The second low-friction-coefficient road-surface determination means M2 compares the difference between the average value of the wheel speeds of the right and left front wheels and the average value of the wheel speeds of the right and left rear wheels with a threshold reference average speed value. If the difference exceeds the threshold reference average speed value, the determination is made that the road surface has a low friction coefficient. Accordingly, the second method has an advantage wherein whether the road surface has a low friction coefficient can be determined without being affected by the steering angle of the front wheels. Nevertheless, the second method has some disadvantages. First, it is not possible to determine whether there is a difference between the friction coefficient of the road surface located under the right wheels and the friction coefficient of the road surface located under the left wheels. Second, the determination may be affected by the failure of the wheel-speed sensors Sa for the rear wheels.

The third low-friction-coefficient road-surface determination means M3 compares the difference between the wheel speed of the left driving wheel (the left front wheel in this embodiment) and the wheel speed of the right driving wheel (the right front wheel in this embodiment) with a threshold reference driving wheel speed value. If the difference exceeds the threshold reference driving wheel speed value, the determination is made that the road surface has a low friction coefficient. Accordingly, the third method has an advantage wherein the vehicle may be in such a dangerous state that the road surface with a low friction coefficient causes the differential gear Df for the front wheels to have the right front wheel and the left front wheel rotating at different wheel speeds. The third low-friction-coefficient road-surface determination means M3 can reliably determine whether the above-mentioned dangerous event takes place. Nevertheless, the third method has a disadvantage. The friction coefficient that the third low-friction-coefficient road-surface determination means M3 can determine is limited to the road-surface areas located under one of the left or right front wheels.

The fourth low-friction-coefficient road-surface determination means M4 compares the actual vehicle-body acceleration calculated from the revolutions of the front-side and the rear-side differential gears Df and Dr with the reference vehicle-body acceleration calculated from the driving force of the engine E. If the actual vehicle-body acceleration exceeds the reference vehicle-body acceleration by a margin that is larger than a threshold reference vehicle-body acceleration value, the determination is made that the road surface has a low friction coefficient. Accordingly, the fourth method has some advantages wherein even when all four wheels slip, the fourth low-friction-coefficient road-surface determination means M4 can determine that the road surface has a low friction coefficient. In addition, the revolutions of the differential gears Df and Dr are used in the determination. Accordingly, even in the event that any of the wheel-speed sensors Sa fails to work properly, such a failure does not affect the determination. Nevertheless, the fourth method has a disadvantage. If the road surface has a relatively-small or nominal friction coefficient, the determination can only be made with a decreased degree of accuracy.

Figure 12:
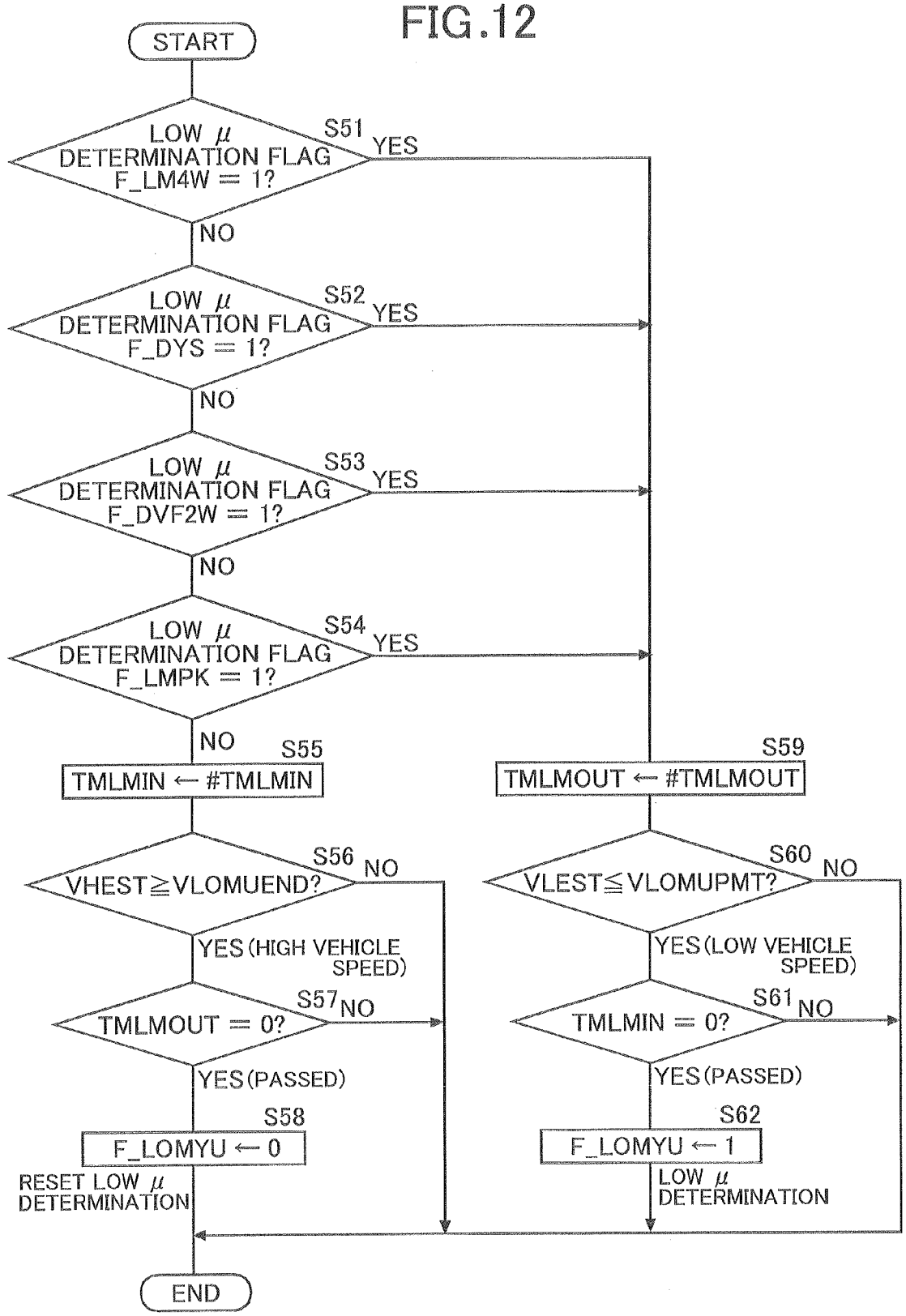
FIG. 12 is a flowchart of a sub-routine of step S2 of the main routine performed to determine a low-friction-coefficient road-surface-coefficient.

Next, a sub-routine of step S2 (low-friction-coefficient road-surface total determination) will be described by referring to a flowchart shown in FIG. 12.

At step S51, a determination is made as to the state of the first low-friction-coefficient road-surface determination flag F LM4W. At step S52, a determination is made as to the state of the second low-friction-coefficient road-surface determination flag F DYS. At step S53, a determination is made as to the state of the third low-friction-coefficient road-surface determination flag F DVF2W. At step S54, a determination is made as to the state of the downward-slope descending-degree determination flag F LMPK.

If a value "0", meaning that the road surface has a high friction coefficient, is obtained as the determination result of each of steps S51 to S54, the operational flow proceeds to steps S55 to S58. If a value "1", meaning that the road surface has a low friction coefficient, is obtained as the determination result of at least one of steps S51 to S54, the operational flow proceeds to steps S59 to S62.

Description is now given as to a case where a value "0", meaning that the road surface has a high friction coefficient, is obtained as the determination result of each of steps S51 to S54. Firstly, at step S55, a determination delay timer TMLMIN is set at a predetermined value #TMLMIN. Then, if at step S56 a determination is made that the highest speed of the four wheel speeds (VHEST) is equal to or greater than a threshold reference cancellation speed value (VLOMUEND), and, at the same time, at step S57 a determination is made that the time counted by the determination delay timer has expired (i.e., TMLMOUT=0), the low-friction-coefficient road-surface total-determination flag F LOMYU is set to zero (i.e., F LOMYU=0, meaning that the road surface has a high friction coefficient) at step S58.

Description is now turned to a case where a value "1", meaning that the road surface has a low friction coefficient, is obtained as the determination result of at least one of steps S51 to S54. First, at step S59, a reset delay timer TMLMOUT is set at a predetermined value #TMLMOUT. Then, if at step S60 a determination is made that the lowest speed of the four wheels (VLEST) is equal to or less than a threshold reference speed value (VLOMUFMT), and, at the same time, at step S61 a determination is made that the time counted by the reset delay timer has expired (i.e., TMLMIN=0), the low-friction-coefficient road-surface total-determination flag F LOMYU is set to one (i.e., F LOMYU=1, meaning that the road surface has a low friction coefficient) at step S62.

As has been described thus far, the road-surface friction coefficient is determined by using the four methods of determining the friction coefficient of the road surface. Accordingly, each of the four methods can compensate for the disadvantages of the other remaining methods, and the advantages of each method can have their own positive or desirable effects. Thus, the present invention is able to determine the friction coefficient of the road surface with a high degree of accuracy. In particular, such a high degree of accuracy in determining the friction coefficient of the road surface can be accomplished even in the case of a four-wheel-drive vehicle.

Figure 13:
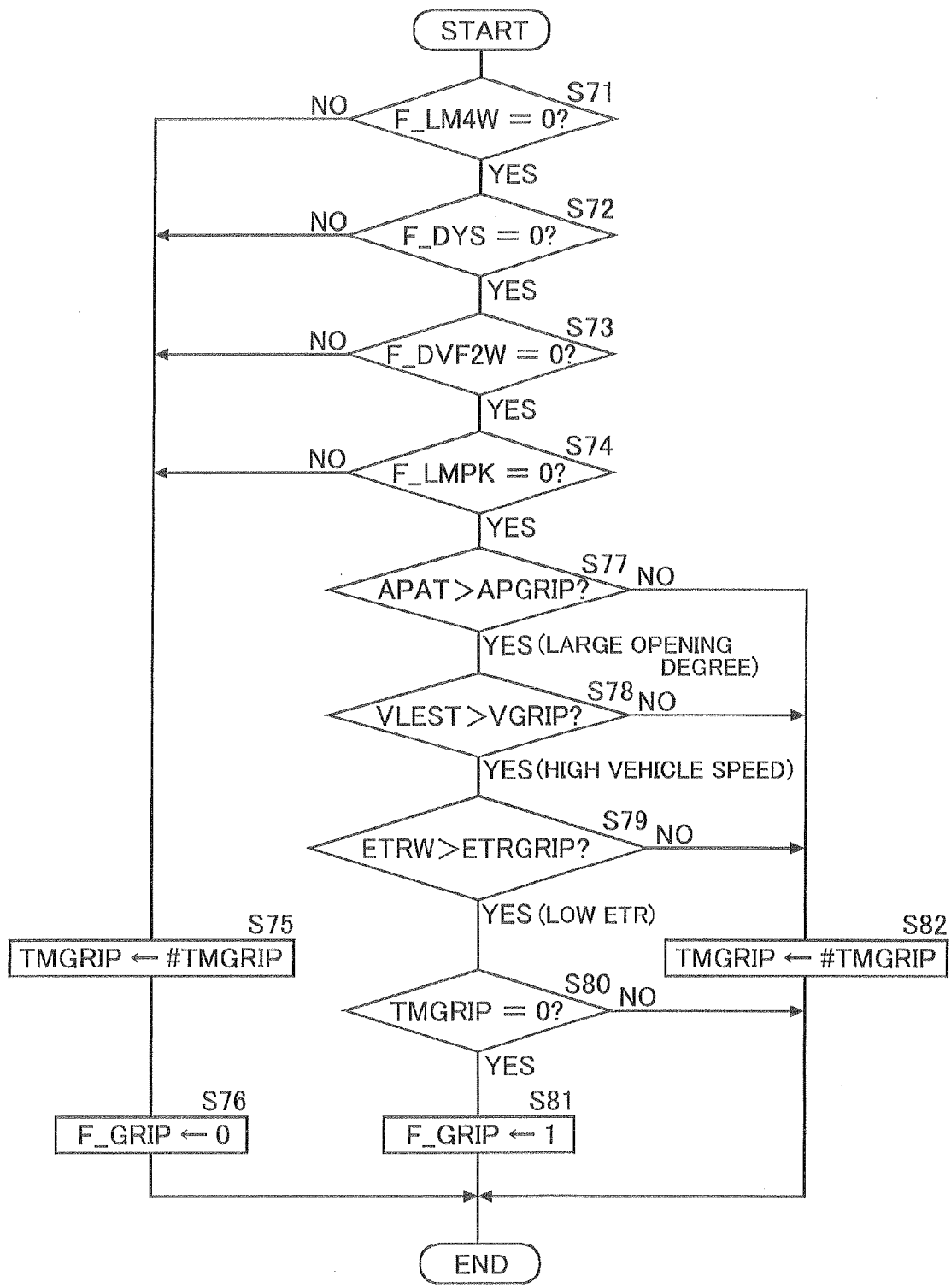
FIG. 13 is a flowchart of a sub-routine of step S3 of the main routine performed to determine a grip-running determination.

Subsequently, a sub-routine of step S3 (grip-running determination) will be described by referring to a flowchart shown in FIG. 13.

At step S71, a determination is made as to the state of the first low-friction-coefficient road-surface determination flag F LM4W. At step S72, a determination is made as to the state of the second low-friction-coefficient road-surface determination flag F DYS. At step S73, a determination is made as to the state of the third low-friction-coefficient road-surface determination flag F DVF2W. At step S74, a determination is made as to the state of the downward-slope descending-degree determination flag F LMPK.

Description is now given as to a case where a value "1", meaning that the road surface has a low friction coefficient, is obtained as the determination result of at least one of steps S71 to S74. First, at step S75, a grip-determination delay timer TMGRIP is set at a predetermined value #TMGRIP. Then, at step S76, the grip-running determination flag F GRIP is set to zero (i.e., F GRIP=0, meaning that the vehicle is running without gripping (non-grip running)).

Description now turns to a case where a value "0", meaning that the road surface has a high friction coefficient, is obtained as the determination result of every one of steps S71 to S74. First, at step S77, a determination is made as to whether the accelerator opening degree APAT is larger than a threshold APGIP. If APAP>APGIP, then another determination is made as to whether the lowest speed of the four wheels (VLEST) is higher than a threshold (VGRIP) at step S78. If VLEST>VGRIP, then still another determination is made as to whether the slip rate of the torque converter (ETRW) is higher than a threshold reference slip rate value (ETRGRIP) at step S79. If ETRW>ETRGRIP, then YES is the determination result of every one of the steps S77 to S79. Such determination results can be interpreted as: the accelerator pedal is depressed sufficiently; the vehicle is running at a speed that is sufficiently high; and the torque converter slips sufficiently (the loads on wheels are large). This state leads to a determination that the wheels grip the road surface. If such a state continues until a determination at step S80 is made that the time counted by the grip-determination delay timer TMGRIP has expired (i.e., TMGRIP=0), the grip-running determination flag F GRIP is set to one (i.e., F GRIP=1, meaning that the vehicle is running with good gripping (grip running)) at step 81.

In contrast, suppose a case where NO is obtained as the determination result of one of the steps S77 to S79. This state leads to a determination that the wheels do not grip the road surface. Accordingly, at step S82, the grip-determination delay timer TMGRIP is set at a predetermined value #TMGRIP.

Figure 14:
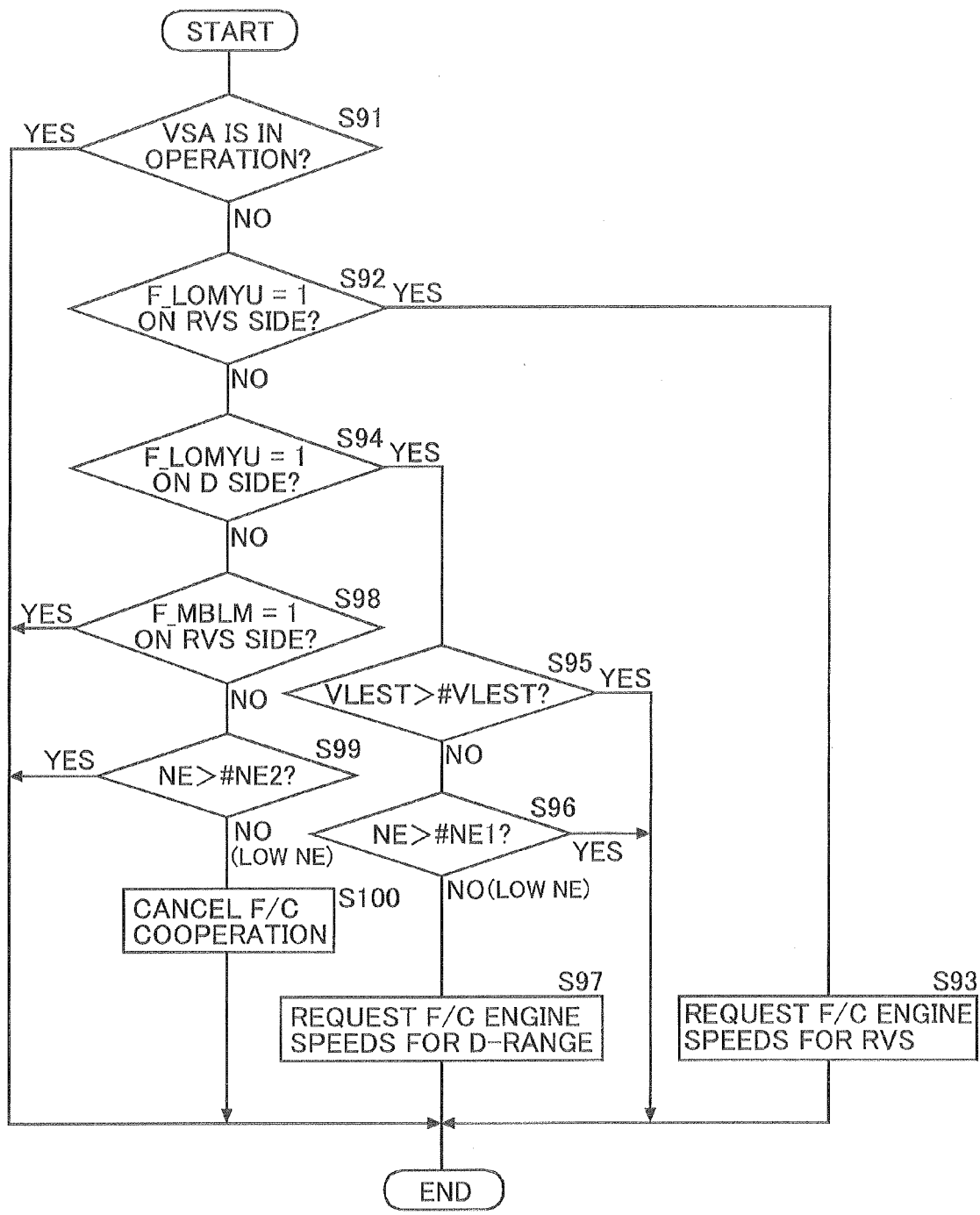
FIG. 14 is a flowchart of a sub-routine of step S5 of the main routine performed upon a request for switching of the fuel-cutting engine speeds being made.

Subsequently, a sub-routine of step S5 (request for the switching of the fuel-cutting engine speeds) will be described by referring to a flowchart shown in FIG. 14. This routine is executed if the determination made by the low-friction-coefficient road-surface total-determination means M5 is that the low-friction-coefficient road-surface total-determination flag should be set to one (i.e., F LOMYU=1, meaning that the road surface has a low friction coefficient).

First, at step S91, a determination is made as to whether a vehicle stability assist system (VSA) is in operation. The VSA is a system used to stabilize the behavior of the vehicle by appropriately distributing the driving force or the braking force between the right wheels and the left wheels. If the VSA is in operation, fuel-cutting control is not executed to prevent the fuel-cutting control from interfering with operation of the VSA.

If the determination at step S92 is made that the transmission T is in the reverse range and that the low-friction-coefficient road-surface total-determination flag has been set to one (i.e., F LOMYU=1, meaning that the road surface has a low friction coefficient), the fuel-cutting engine speed for the reverse range is requested to prevent the wheels of a vehicle running backwards from slipping at step S93. If the engine speed exceeds the fuel-cutting engine speed, the fuel to the engine E is cut off or the supply of fuel is reduced to reduce the output of the engine E. When a vehicle starts running backwards on ice or when a vehicle that has got stuck on a snowy road tries to escape from such a situation, the engine speed may rise excessively, which only worsens the slipping of the wheels. With the fuel-cutting control, such worsening of the slipping is prevented. The switching of the fuel-cutting engine speed in the reverse range is executed only with a determination that the road surface has a low friction coefficient (i.e., the low-friction-coefficient road-surface total-determination flag F LOMYU=1). No such switching of the fuel-cutting engine speed in the reverse range is executed with a determination that there is a possibility or likelihood of the road surface having a low friction coefficient (i.e., the low-friction-coefficient suspect determination flag F MBLM=1).

If a determination at step S92 is made that the transmission T is in the reverse range and that the low-friction-coefficient road-surface total-determination flag has been set to zero (i.e., F LOMYU=0, meaning that the road surface has a high friction coefficient) and a determination at the subsequent step S94 is made that the transmission T is in the D range (or Drive range) and that the low-friction-coefficient road-surface total-determination flag has been set to one (i.e., F LOMYU=1, meaning that the road surface has a low friction coefficient), the operational flow proceeds to steps S95 to S97. Suppose a case where a determination at step S95 is made that the lowest speed of the four wheels (VLEST) does not exceed a threshold reference fuel-cutting engine speed value #VLEST, and, at the same time, where a determination at step S96 is made that the engine speed NE does not exceed a first threshold reference engine speed value #NE1. To put it differently, suppose a case where both the wheel speed and the engine speed are low. In this case, the fuel-cutting engine speed for the D range is requested at step S97. If the engine speed exceeds the fuel-cutting engine speed, the supply of fuel to the engine E is cut to reduce the output of the engine E.

The reason behind the above-described way of fuel-cutting control is as follows. Cutting the fuel supply to the engine E of a vehicle that is drifting and thus lowering the engine output may make control of the vehicle difficult. While a vehicle is drifting, both the wheel speed and the engine speed are high. When a vehicle starts on ice or when a vehicle that has got stuck on a snowy road tries to escape, both the wheel speed and the engine speed are low. Accordingly, the above-described way of fuel cutting control has an effect of making execution of fuel-cutting harder on a vehicle that is drifting and easier on a vehicle which is starting on ice or which is trying to escape from a stuck state. The fuel-cutting, if executed on a vehicle of the latter cases, can prevent the vehicle from slipping.

If the determination at step S94 is made that the transmission T is in the D range and that the low-friction-coefficient road-surface total-determination flag has been set to zero (i.e., F LOMYU=0, meaning that the road surface has a high friction coefficient), the fuel-cutting control is cancelled at step S100. The fuel-cutting control, however, is not cancelled if a determination at S98 is made that the transmission T is in a reverse range and at the same time that the low-friction-coefficient suspect determination flag F MBLM has been set to one (i.e., F MBLM=1, meaning that there is a possibility or likelihood of the road surface having a low friction coefficient). The fuel-cutting control is not cancelled if a determination at S99 is made that the engine speed NE exceeds a second threshold reference engine speed value #NE2.

As has been described thus far, while the vehicle is running on a road whose surface has a low friction coefficient, the fuel-cutting engine speeds are switched not only in the case of the reverse range, but also in the case of the D range. Accordingly, the slipping that would otherwise be caused by an excessive driving force can be avoided while the vehicle is travelling forwards. Besides, appropriate fuel-cutting engine speeds can be individually set for a vehicle travelling backwards and for a vehicle travelling forwards.

Figure 15:
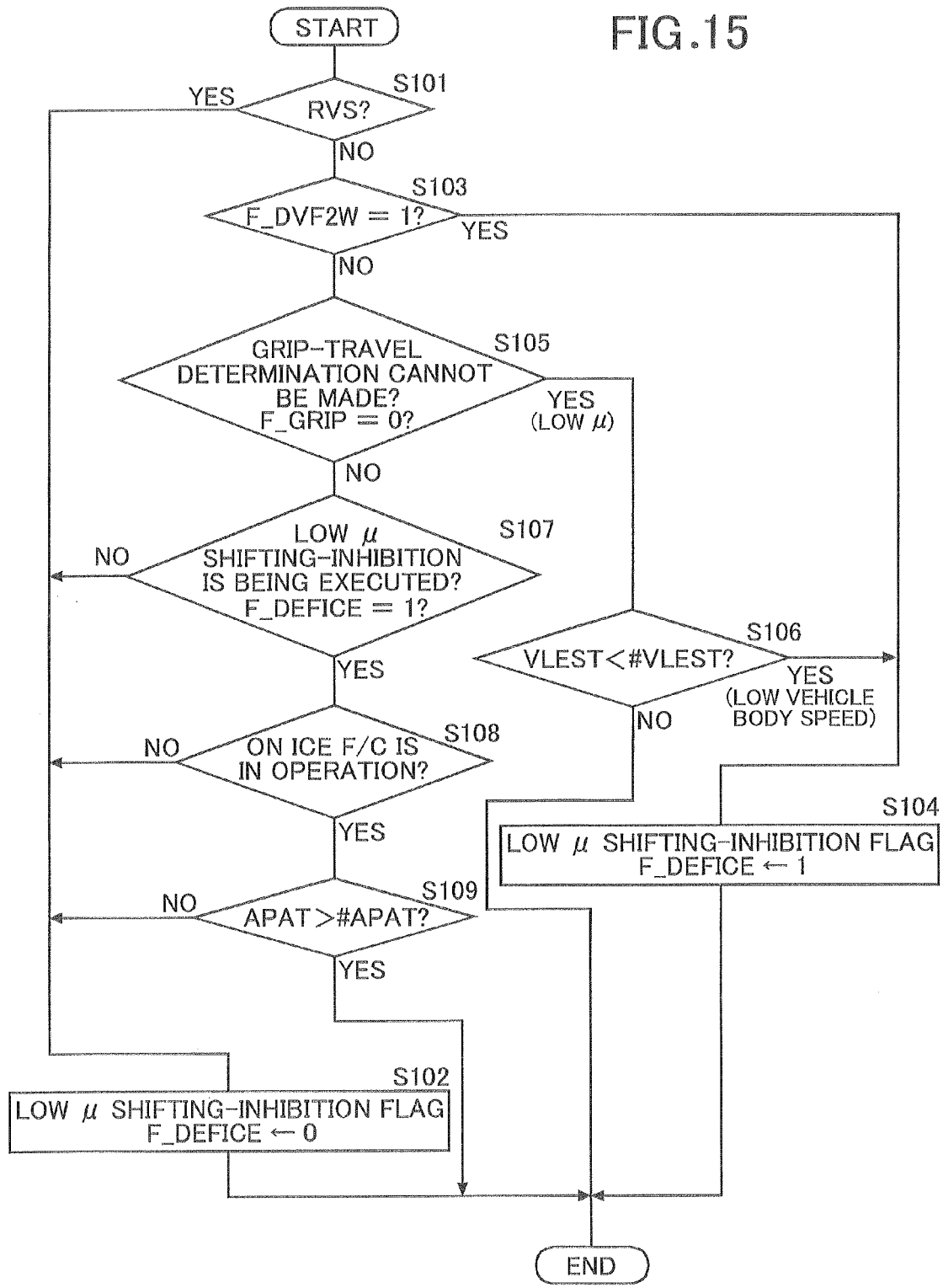
FIG. 15 is a flowchart of a sub-routine of step S7 of the main routine performed to execute inhibiting of shifting.

Subsequently, a sub-routine of step S7 (execution of the shifting inhibition) will be described by referring to a flowchart shown in FIG. 15. This routine is executed if the determination by the low-friction-coefficient road-surface suspect determination means M7 is made that the low-friction-coefficient suspect determination flag F MBLM should be set to one (i.e., F MBLM=1, meaning that there is a possibility or likelihood of the road surface having a low friction coefficient).

First, a determination is made at step S101 as to whether the transmission T is in the reverse range. If the transmission T is in the reverse range, both the up-shifting and the down-shifting of speed ranges are not possible. Accordingly, at step S102, a low-friction-coefficient road-surface shifting-inhibition flag F DEFICE is set to zero (meaning that the shifting inhibition will not be executed).

Now, suppose a case where the determination at step S101 is made that the transmission T is in the D range and where a determination at step S103 is made that the low-frictioncoefficient road-surface determination flag F DVF2W has been set to one (i.e., F DVF2W=1, meaning that the road surface has been of a low friction coefficient). Note that the determination to set the low-friction-coefficient road-surface determination flag F DVF2W is made according to the third method described above. The determination at step S103 is made that F DVF2W=1, that is, the road surface has a low friction coefficient because the difference between the speed of the right front wheel and the speed of the left front wheel exceeds the threshold. In the case where the transmission T is in the D range and, at the same time, F DVR2W=1, the low-friction-coefficient road-surface shifting-inhibition flag F DEFICE is set to one (meaning that the shifting inhibition will be executed) at step S104. This is because the right-left front-wheel-speed difference is made to exceed the threshold by the slipping of any one of the right and the left front wheels (driving wheels) riding on a snowy road. If the down-shifting of speed ranges is allowed while only one of the two front wheels is slipping on snow, the driving force increases and consequently the vehicle may get stuck.

Now, suppose a case where the determination at step S103 is made that the low-friction-coefficient road-surface determination flag F DVF2W has been set, according to the third method, to zero (i.e., F DVF2W=0, meaning that the road surface has a high friction coefficient), and at the same time where a determination at step S105 is made that the grip-running flag F GRIP has been set to zero (i.e., F GRIP=0, meaning that the road surface has a low friction coefficient). To put it differently, suppose a case where a determination that the road surface has a low friction coefficient is obtained according to any of the methods except the third, i.e., according to any of the first, second, and fourth methods. In this case, if a determination at step S106 is made that the speed of the lowest wheel VLEST is below the threshold #VLEST, the low-friction-coefficient road-surface shifting-inhibition flag F DEFICE is set to one (meaning that the shifting inhibition will be executed) at step S104.

The reason for the above situation is as follows. Suppose a case where the determination is made that the road surface has a low friction coefficient according to any of the first, second, and fourth methods. Such a determination may result from a state where one of the right and left front wheels (driving wheels) is riding on a snowy road and is slipping. This, however, is not always the case. Such a determination may also result from a state where a vehicle is drifting. Incidentally, if the speed of the lowest wheel VLEST (i.e., the vehicle body speed) is low, the vehicle is presumably on the verge of getting stuck. Accordingly, on the basis of such a presumption, the low-friction-coefficient road-surface shifting-inhibition flag F DEFICE is set to one (meaning that the shifting inhibition will be executed) at step S104. Thus the down-shifting of speed range is inhibited to prevent the generation of torque from becoming excessive. Consequently, the vehicle can smoothly escape from the stuck state.

Now, suppose a case where the low-friction-coefficient road-surface shifting-inhibition flag F DEFICE is set to one (meaning that the shifting inhibition will be executed) at step S104. In this case, if the accelerator opening degree exceeds a threshold, the inhibition of down-shifting the speed ranges will continue; and if the accelerator opening degree is equal to or less than the threshold (e.g., the accelerator opening is completely closed), down-shifting of the speed ranges will be permitted. This is because with a large accelerator opening degree, down-shifting of speed range, if such an event occurs, increases the driving force and the vehicle may get stuck. In contrast, with a small accelerator opening degree, there is no possibility of down-shifting occurring, which might cause the vehicle to get stuck.

Now suppose a case where NO is obtained as the determination result of step S105, meaning that the road surface has a high friction coefficient, and, at the same time, where a determination at step S107 is made that the low-friction-coefficient road-surface shifting-inhibition flag F DEFICE has been set to one, and thus the inhibition of shifting the speed ranges is being executed. In this case, a determination at step S108 that the fuel-cutting control is not executed leads to a determination that the road surface has a high friction coefficient and no inhibition of shifting the speed ranges is necessary. With such a determination, the low-friction-coefficient road-surface shifting-inhibition flag F DEFICE is set to zero (meaning that the shifting inhibition will be cancelled) at step S102. Conversely, suppose a case where the determination at step S108 is made that the fuel-cutting control is being executed. In this case, a determination at step S109 that the accelerator opening degree APAT is equal to or less than the threshold #APAT leads to a determination that no inhibition of shifting speed ranges is necessary. With such a determination, the low-friction-coefficient road-surface shifting-inhibition flag F DEFICE is set to zero (meaning that the shifting inhibition will be cancelled) at step S102.

Figure 16:
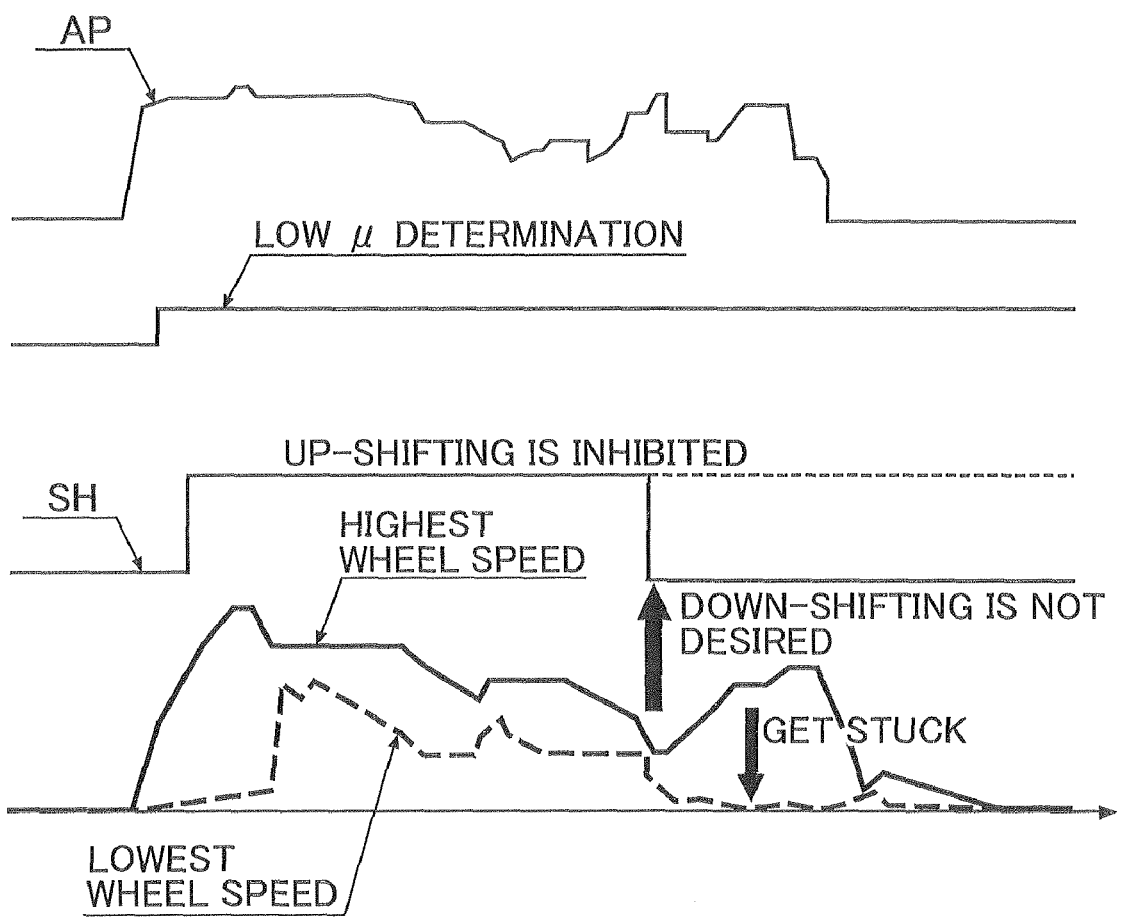
FIG. 16 is a time chart corresponding to FIG. 15.

Now suppose a case where a vehicle is running on an upward-slope snowy road and is on the verge of getting stuck. In this case, as FIG. 16 shows, if a down-shifting of speed ranges occurs and the driving force increases, the wheels may dig into the snow and the vehicle may get stuck. Executing the above-described inhibition of the down-shifting of speed ranges prevents the vehicle from getting stuck.

While this invention has been described with respect to various specific examples and embodiments, it is to be understood that the invention is not limited thereto and that it can be variously practiced without departing from the spirit and scope of the invention as recited in the following claims.

What is claimed is:

1. A driving-force control apparatus for a vehicle having an engine (E), a plurality of wheels, and a transmission (T), the driving-force control apparatus including a driving-force control means (M8) for determining a state of a road surface on which the vehicle is running and for controlling a driving force of the vehicle based on the determined state of the road surface, the driving-force control apparatus comprising:
a first low-friction-coefficient road-surface determination means (M1) for determining whether the road surface has a low friction coefficient based on a highest wheel speed and a lowest wheel speed of the plurality of wheels;
a second low-friction-coefficient road-surface determination means (M2) for determining whether the road surface has a low friction coefficient based on wheel speeds of front and rear wheels of the plurality of wheels;
a third low-friction-coefficient road-surface determination means (M3) for determining whether the road surface has a low friction coefficient based on wheel speeds of left and right driving wheels of the plurality of wheels;
a fourth low-friction-coefficient road-surface determination means (M4) for determining whether the road surface has a low friction coefficient by comparing a reference vehicle-body acceleration calculated from a driving force of the engine (E) with an actual vehicle-body acceleration calculated from a measured number of revolutions of a differential gear (Df, Dr);
a low-friction-coefficient road-surface total-determination means (M5) for determining whether the road surface has a low friction coefficient based on the determination results of the first to fourth low-friction-coefficient road-surface determination means (M1 to M4);
a grip-travel determination means (M6) for determining whether the vehicle is running with good gripping based on the determination results of the first to fourth low-friction-coefficient road-surface determination means (M1 to M4) and a driving state of the vehicle; and
a low-friction-coefficient road-surface suspect determination means (M7) for determining whether there is a possibility that the road surface has a low friction coefficient based on the determination results of the low-friction-coefficient road-surface total-determination means (M5) and the grip-travel determination means (M6).

2. The driving-force control apparatus according to claim 1, wherein the first low-friction-coefficient road-surface determination means (M1) compares a difference between the highest wheel speed and the lowest wheel speed with a threshold reference speed difference value, and determines that the road surface has a low friction coefficient if the difference between the highest and lowest wheel speeds is greater than the threshold reference speed difference value.

3. The driving-force control apparatus according to claim 1, wherein the second low-friction-coefficient road-surface determination means (M2) compares a difference between an average value of the wheel speeds of the front wheels and an average value of the wheel speeds of the rear wheels with a threshold reference average speed value, and determines that the road surface has a low friction coefficient if the difference between the average values of the front and rear wheel speeds is greater than the threshold reference average speed value.

4. The driving-force control apparatus according to claim 1, wherein the third low-friction-coefficient road-surface determination means (M3) compares a difference between the wheel speed of the left driving wheel and the wheel speed of the right driving wheel with a threshold reference driving wheel speed value, and determines that the road surface has a low friction coefficient if the difference between the wheel speeds of the left and right driving wheels is greater than the threshold reference driving wheel speed value.

5. The driving-force control apparatus according to claim 1, wherein the fourth low-friction-coefficient road-surface determination means (M4) compares the reference vehicle-body acceleration calculated from the driving force of the engine (E) with the actual vehicle-body acceleration calculated from number of revolutions of front and rear differential gears (Df, Dr), and determines that the road surface has a low friction coefficient if the actual vehicle-body acceleration exceeds the reference vehicle-body acceleration by an amount that is greater than a threshold reference vehicle-body acceleration value.

6. The driving-force control apparatus according to claim 1, wherein
the low-friction-coefficient road-surface total-determination means (M5) makes a total determination that the road surface has a low friction coefficient if at least one of the first to fourth low-friction-coefficient road-surface determination means (M1 to M4) determines that the road surface has a low friction coefficient, and
the low-friction-coefficient road-surface total-determination means (M5) makes a total determination that the road surface has a high friction coefficient if none of the first to fourth low-friction-coefficient road-surface determination means (M1 to M4) determines that the road surface has a low friction coefficient.

7. The driving-force control apparatus according to claim 1, wherein
the grip-travel determination means (M6) determines that the vehicle is running with good gripping if:
none of the first to fourth low-friction-coefficient road-surface determination means (M1 to M4) determines that the road surface has a low friction coefficient;
an accelerator opening degree exceeds a threshold reference accelerator opening degree value;
a vehicle speed exceeds a threshold reference vehicle speed value; and
a slip rate of a torque converter exceeds a threshold reference slip rate value, and
the grip-travel determination means (M6) determines that the vehicle is running without gripping if at least one of the first to fourth low-friction-coefficient road-surface determination means (M1 to M4) determines that the road surface has a low friction coefficient.

8. The driving-force control apparatus according to claim 1, wherein
the low-friction-coefficient road-surface suspect determination means (M7) determines that there is a possibility that the road surface has a low friction coefficient if the low-friction-coefficient road-surface total-determination means (M5) determines that the road surface has a low friction coefficient, and
if the low-friction-coefficient road-surface total-determination means (M5) does not determine that the road surface has a low friction coefficient, the low-friction-coefficient road-surface suspect determination means (M7) determines that there is a possibility that the road surface has a low friction coefficient unless the grip-travel determination means (M6) determines that the vehicle is running with good gripping.

9. The driving-force control apparatus according to claim 1, wherein
the driving-force control means (M8) includes a fuel-cutting control means (M8A) that terminates a supply of fuel to the engine (E), and
if the low-friction-coefficient road-surface total-determination means (M5) determines that the road surface has a low friction coefficient, the fuel-cutting control means (M8A) executes termination of the supply of fuel to the engine to reduce the driving force.

10. The driving-force control apparatus according to claim 9, wherein the fuel-cutting control means (M8A) switches engine speeds as a condition for executing the termination of the supply of fuel to the engine, between a time during which a forward-travelling range is selected and a time during which a backward-travelling range is selected.

11. The driving-force control apparatus according to claim 1, wherein
the driving-force control means (M8) includes a shift-changing inhibition means (M8B) that inhibits the shift-changing of the transmission (T), and
the shift-changing inhibition means (M8B) inhibits the down-shifting to a speed range that is equal to or lower than a predetermined speed range:
if the third low-friction-coefficient road-surface determination means (M3) determines that the road surface has a low friction coefficient; or
if any of the first, second, and fourth low-friction-coefficient road-surface determination means (M1, M2, and M4) determines that the road surface has a low friction coefficient and, at the same time, if the lowest wheel speed becomes lower than a threshold reference wheel speed value.

12. The driving-force control apparatus according to claim 11, wherein the shift-changing inhibition means (M8B) cancels the inhibition of shift-changing:

if the vehicle is running with good gripping and the fuel-cutting control means (M8A) is not in operation; or if the vehicle is running with good gripping and the fuel-cutting control means (M8A) is in operation, and, in addition, if the accelerator opening degree is less than a threshold reference accelerator opening degree value.

\* \* \* \* \*